United States Patent
Kubota et al.

(10) Patent No.: US 10,604,122 B2
(45) Date of Patent: Mar. 31, 2020

(54) FOREIGN MATTER REMOVAL DEVICE AND VEHICLE PROVIDED WITH SAME

(71) Applicant: KOITO MANUFACTURING CO., LTD., Tokyo (JP)

(72) Inventors: Akinobu Kubota, Shizuoka (JP); Yasuhiro Ichikawa, Shizuoka (JP); Hiroaki Kimura, Shizuoka (JP); Junji Baba, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 95 days.

(21) Appl. No.: 15/740,871

(22) PCT Filed: Jun. 29, 2016

(86) PCT No.: PCT/JP2016/069335
§ 371 (c)(1),
(2) Date: Dec. 29, 2017

(87) PCT Pub. No.: WO2017/002878
PCT Pub. Date: Jan. 5, 2017

(65) Prior Publication Data
US 2018/0186342 A1  Jul. 5, 2018

(30) Foreign Application Priority Data

Jun. 30, 2015 (JP) .................................. 2015-131785
Jun. 30, 2015 (JP) .................................. 2015-131786
Jun. 30, 2015 (JP) .................................. 2015-131788

(51) Int. Cl.
*B60S 1/56* (2006.01)
*B08B 5/02* (2006.01)
(Continued)

(52) U.S. Cl.
CPC .................. *B60S 1/56* (2013.01); *B08B 5/02* (2013.01); *B60S 1/54* (2013.01); *H04N 5/225* (2013.01); *H04N 7/18* (2013.01)

(58) Field of Classification Search
CPC ...... B60S 1/56; B60S 1/00; B60S 1/54; F04B 35/01; F04B 39/0005; H04N 5/225
See application file for complete search history.

(56) References Cited

U.S. PATENT DOCUMENTS

2006/0231083 A1  10/2006  Tsurumoto
2009/0250533 A1  10/2009  Akiyama et al.
(Continued)

FOREIGN PATENT DOCUMENTS

CN  202779193 U  3/2013
CN  104369720 A  2/2015
(Continued)

OTHER PUBLICATIONS

Communication dated Jan. 25, 2019, issued by the European Patent Office in counterpart European Application No. 16817986.9.
(Continued)

*Primary Examiner* — Dung Van Nguyen
(74) *Attorney, Agent, or Firm* — Sughrue Mion, PLLC

(57) ABSTRACT

A foreign matter removal device is configured to remove foreign matters on a lens (101) of an in-vehicle camera (100) attached to a vehicle so that the lens (101) of the in-vehicle camera (100) is exposed toward an outside of a body panel of a vehicle. The foreign matter removal device includes a generation unit configured to generate high-pressure air and a nozzle unit (2) having a nozzle (22) configured to inject the high-pressure air toward the lens (101) and an attachment part (21) formed integrally with the nozzle (22) and attachable to a housing (102) of the in-vehicle camera (100). A tip end of the nozzle (22) is positioned with respect to the lens
(Continued)

(101) in a state where the attachment part (21) is attached to the housing (102).

21 Claims, 26 Drawing Sheets

(51) Int. Cl.
    *H04N 5/225*     (2006.01)
    *H04N 7/18*     (2006.01)
    *B60S 1/54*     (2006.01)

(56) References Cited

U.S. PATENT DOCUMENTS

| | | | |
|---|---|---|---|
| 2011/0073142 A1* | 3/2011 | Hattori | B60S 1/0848 134/56 R |
| 2011/0292212 A1* | 12/2011 | Tanabe | B05B 1/08 348/148 |
| 2013/0008421 A1 | 1/2013 | Lee | |
| 2013/0092758 A1 | 4/2013 | Tanaka et al. | |
| 2014/0270379 A1* | 9/2014 | Snider | B60R 1/00 382/104 |
| 2015/0040953 A1 | 2/2015 | Kikuta et al. | |
| 2015/0078940 A1 | 3/2015 | Kikuta et al. | |
| 2015/0151722 A1 | 6/2015 | Gokan et al. | |
| 2015/0166021 A1 | 6/2015 | Gokan et al. | |
| 2015/0185592 A1 | 7/2015 | Eineren et al. | |
| 2015/0203077 A1 | 7/2015 | Gokan | |
| 2015/0296108 A1* | 10/2015 | Hayakawa | G03B 17/08 348/148 |
| 2015/0343999 A1 | 12/2015 | Lopez Galera et al. | |
| 2015/0353024 A1 | 12/2015 | Cooper | |
| 2017/0028968 A1* | 2/2017 | Kubota | B60R 1/00 |
| 2017/0355353 A1* | 12/2017 | Kato | B60S 1/481 |

FOREIGN PATENT DOCUMENTS

| | | |
|---|---|---|
| CN | 104470771 A | 3/2015 |
| EP | 2 113 736 A1 | 11/2009 |
| EP | 2878999 A1 | 6/2015 |
| EP | 2949520 A1 | 12/2015 |
| EP | 3239006 A1 | 11/2017 |
| JP | 4-1708 U | 1/1992 |
| JP | 5-19615 U | 3/1993 |
| JP | 3063922 U | 12/1999 |
| JP | 2001171491 A | 6/2001 |
| JP | 2002-240628 A | 8/2002 |
| JP | 2007-53448 A | 3/2007 |
| JP | 200983730 A | 4/2009 |
| JP | 2009-248661 A | 10/2009 |
| JP | 2011-57088 A | 3/2011 |
| JP | 2011-245989 A | 12/2011 |
| JP | 201235654 A | 2/2012 |
| JP | 2012-201122 A | 10/2012 |
| JP | 2013-006481 A | 1/2013 |
| JP | 2013-018404 A | 1/2013 |
| JP | 2013-100077 A | 5/2013 |
| JP | 2013-154771 A | 8/2013 |
| JP | 201469586 A | 4/2014 |
| JP | 201583830 A | 4/2015 |
| JP | 2015224032 A1 | 12/2015 |
| WO | 2008/099514 A1 | 8/2008 |
| WO | 2014010579 A1 | 1/2014 |
| WO | 2015159763 A1 | 10/2015 |

OTHER PUBLICATIONS

Communication dated Mar. 13, 2018, issued by the Japanese Patent Office in counterpart Japanese application No. 2018-023055.
Communication dated Mar. 13, 2018, issued by the Japanese Patent Office in counterpart Japanese application No. 2018-023056.
International Search Report dated Sep. 27, 2016, issued by the International Searching Authority in counterpart International Application No. PCT/JP2016/069335 (PCT/ISA/210).
Written Opinion dated Sep. 27, 2016, issued by the International Searching Authority in counterpart International Application No. PCT/JP2016/069335 (PCT/ISA/237).
Office Action dated May 8, 2018 by the Japanese Patent Office in counterpart Japanese Patent Application No. 2018-023056.
Communication dated Oct. 23, 2019, issued by the State Intellectual Property Office of P.R. China in counterpart Chinese Application No. 201680038321.8.

* cited by examiner

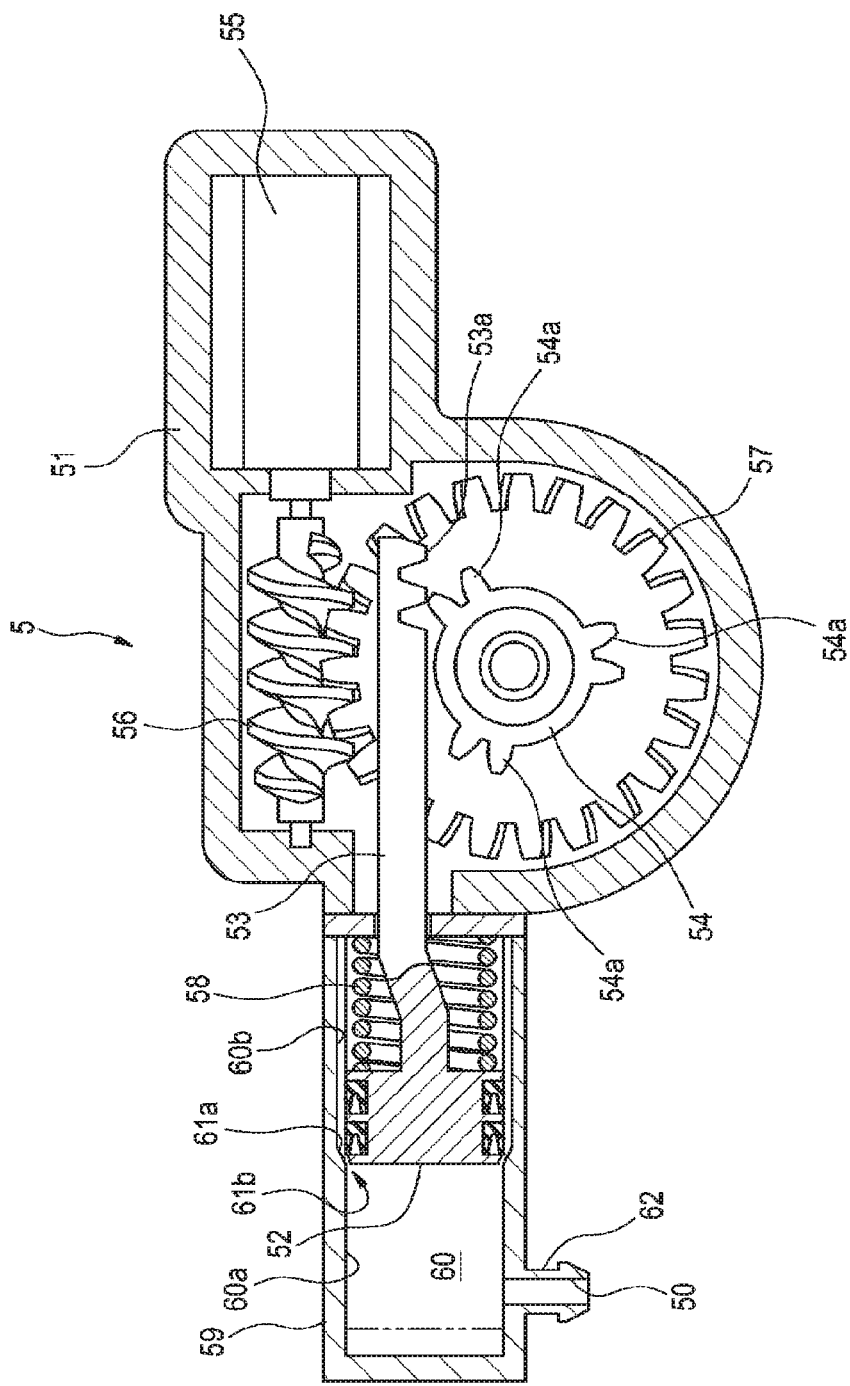

FOREIGN MATTER REMOVAL DEVICE AND VEHICLE PROVIDED WITH SAME

TECHNICAL FIELD

The present invention relates to a foreign matter removal device for removing foreign matters by injecting high-pressure air, and a vehicle including the foreign matter removal device.

BACKGROUND ART

Recently, the number of vehicles equipped with in-vehicle cameras for photographing the situations around the vehicle is increasing. In the in-vehicle cameras, there is a case that a lens as an imaging surface becomes dirty due to rain, mud or the like. Therefore, conventionally, a foreign matter removal device for removing foreign matters by blowing cleaning liquid or high-pressure air or the like to the lens of the in-vehicle camera in order to remove foreign matters such as water droplets adhering on the lens has been known (see Patent Document 1).

In such a foreign matter removal device, the performance of removing foreign matters may be deteriorated when the positioning accuracy of the tip end of the nozzle with respect to the lens of the camera is low. Therefore, for example, a structure has been proposed in which a dedicated bracket is provided on a body panel of a vehicle, and a nozzle is positioned with respect to a lens (specifically, an upper surface of a housing of a camera) via the dedicated bracket (see Patent Document 2).

CITATION LIST

Patent Document

Patent Document 1: Japanese Patent Laid-Open Publication No. 2001-171491
Patent Document 2: Japanese Patent Laid-Open Publication No. 2014-69586

DISCLOSURE OF INVENTION

Problems to be Solved by Invention

However, the shape of the vehicle body varies depending on the type of the vehicle, and the shape of the body panel is different for each vehicle. Therefore, in the method using a dedicated bracket as in Patent Document 1, a dedicated bracket should be prepared for each type of vehicle, and thus, the versatility of the foreign matter removal device at the time of being attached to the vehicle is deteriorated.

Further, as disclosed in Patent Document 1, an injection device that injects high-pressure air requires a device for generating high-pressure air. Normally, such an injection device has a configuration in which outside air is sucked from a tip end of a nozzle and the sucked air is compressed inside the device. However, the tip end of the nozzle is dogged with mud, dust or the like, which may make it difficult to generate high-pressure air. In this case, since the performance of removing foreign matters is deteriorated, a measure against the clogging of the tip end of the nozzle is required.

Further, in the case of blowing high-pressure air onto a lens of a camera, it is difficult to effectively blowing high-pressure air toward the lens when a blow-off port of a nozzle is disposed at a position facing an upper surface of a housing of the camera as in the configuration disclosed in Patent Document 1. Further, when the tip end of the nozzle is formed by a wall portion covering the entire circumferential surface of the blow-off port, it is necessary to make a space for attaching a foreign matter removal device to a vehicle relatively large.

Therefore, the present invention aims to provide a foreign matter removal device in which the versatility at the time of being attached is enhanced while maintaining the performance of removing foreign matters, high-pressure air can be generated even when the tip end of the nozzle is clogged, and space saving at the time of being attached can be achieved, and a vehicle provided with the foreign matter removal device.

Means for Solving the Problems

In order to achieve the above object, the foreign matter removal device of the present invention removes foreign matters on a lens of an in-vehicle camera attached to a vehicle so that the lens of the in-vehicle camera is exposed toward the outside of a body panel of a vehicle, the foreign matter removal device including:
a generation unit for generating high-pressure air; and
a nozzle unit including a nozzle for injecting the high-pressure air toward the lens and an attachment part formed integrally with the nozzle and attachable to a housing of the in-vehicle camera,
in which a tip end of the nozzle is positioned with respect to the lens in a state where the attachment part is attached to the housing.

According to this configuration, the nozzle is attached to the housing of the in-vehicle camera by the attachment part formed integrally with the nozzle. Therefore, the tip end of the nozzle can be accurately positioned with respect to the lens of the in-vehicle camera without using a dedicated bracket for attaching to a body panel of a vehicle, thereby maintaining the performance of removing foreign matters. Further, since the attachment part is attached to the housing of the in-vehicle camera which is small in shape change between products, compared to a body panel of a vehicle, the versatility of the foreign matter removal device at the time of being attached to a vehicle can be enhanced.

Further, in the foreign matter removal device of the present invention,
the housing may have a first surface, a second surface continuous with one end of the first surface, and a third surface located on the side opposite to the second surface and continuous with the other end of the first surface, and
in a state of being attached to the housing, the attachment part may have an opposing surface facing the first surface, a first contact portion elastically deformable in a direction away from the second surface and in contact with the second surface, and a second contact portion elastically deformable in a direction away from the third surface and in contact with the third surface.

According to this configuration, the attachment part of the nozzle unit is fixed to the housing in a state of being deformed along an outer shape of the housing of the in-vehicle camera. Therefore, the tip end of the nozzle can be more accurately positioned with respect to the lens of the in-vehicle camera.

Further, in the foreign matter removal device of the present invention,
the first surface of the housing and the opposing surface of the attachment part may be adhered to each other in a planar manner via an adhesive member.

According to this configuration, the attachment part of the nozzle unit is firmly fixed to the housing of the in-vehicle camera via the adhesive member. Therefore, the tip end of the nozzle can be more accurately positioned with respect to the lens of the in-vehicle camera.

Further, in the foreign matter removal device of the present invention, the housing and the attachment part may be engageable with each other.

According to this configuration, the attachment part of the nozzle unit is fixed in a state of being engaged with the housing of the in-vehicle camera. Therefore, the tip end of the nozzle can be more accurately positioned with respect to the lens of the in-vehicle camera.

Further, in the foreign matter removal device of the present invention, the housing may have a camera front surface on which a lens hole for exposing the lens is formed, and the nozzle may have a positioning portion which is in contact with the camera front surface and positioned with respect to the camera front surface in a state in which the attachment part is attached to the housing.

According to this configuration, the tip end of the nozzle can be accurately positioned with respect to the lens of the in-vehicle camera in a front and rear direction of the camera.

Further, in the foreign matter removal device of the present invention, the generation unit may have a discharge port for discharging the high-pressure air, and the nozzle may have an inlet port through which the high-pressure air is introduced.

The foreign matter removal device may further include a hose connecting the discharge port and the inlet port, and a joint member which connects the hose and the nozzle and can change its posture with respect to the nozzle.

According to this configuration, the orientation of the hose can be changed by changing the posture of the joint member that is a part separate from the nozzle, so that the versatility of the foreign matter removal device at the time of being attached to a vehicle can be enhanced.

Further, in the foreign matter removal device of the present invention, the tip end of the nozzle may be positioned so as to face the center of the lens.

According to this configuration, the performance of removing foreign matters on the lens by high-pressure air is enhanced.

Further, the foreign matter removal device of the present invention removes foreign matters on a lens of a camera attached so that the lens of the camera is exposed toward the outside of a panel member, the foreign matter removal device including:

a generation unit for generating high-pressure air, and a nozzle unit including a nozzle for injecting the high-pressure air toward the lens and an attachment part formed integrally with the nozzle and attachable to a housing of the camera, in which a tip end of the nozzle is positioned with respect to the lens in a state where the attachment part is attached to the housing.

According to this configuration, the nozzle is attached to the housing of the camera by the attachment part formed integrally with the nozzle. Therefore, the tip end of the nozzle can be accurately positioned with respect to the lens of the camera without using a dedicated bracket for attaching to the panel member, thereby maintaining the performance of removing foreign matters. Further, since the attachment part is attached to the housing of the camera which is small in shape change between products, compared to the panel member, the versatility can be enhanced.

Further, the foreign matter removal device of the present invention removes foreign matters adhering to a partition wall interposed between an in-vehicle sensor and a measuring target of the in-vehicle sensor, the foreign matter removal device including a generation unit for generating high-pressure air, and a nozzle unit including a nozzle for injecting the high-pressure air toward the partition wall and an attachment part formed integrally with the nozzle and attachable to a housing of the in-vehicle sensor, in which a tip end of the nozzle is positioned with respect to the partition wall in a state where the attachment part is attached to the housing.

Further, in order to achieve the above object, the foreign matter removal device of the present invention removes foreign matters on a lens of an in-vehicle camera attached to a vehicle so that the lens of the in-vehicle camera is exposed toward the outside of a body panel of a vehicle, the foreign matter removal device including:

a generation unit for generating high-pressure air, and a nozzle for injecting the high-pressure air toward the lens, in which the nozzle has an inlet port through which the high-pressure air is introduced, an ejecting port from which the high-pressure air is ejected, and a communication passage which communicates the inlet port and the ejecting port with each other, and in which the communication passage communicates with a bypass passage via an opening smaller than the ejecting port.

According to this configuration, even when the clogging of the ejecting port of the nozzle temporarily occurs, the air intake for generating high-pressure air can be performed using the bypass passage. Further, since the opening of the bypass passage is formed smaller than the ejecting port of the nozzle, the high-pressure air flowing toward the ejecting port during ejecting is hardly ejected from the opening. Therefore, the performance of removing foreign matters is maintained.

Further, in the foreign matter removal device of the present invention, the bypass passage may be formed so as to merge in an acute angle direction from the rear side with respect to the direction in which the high-pressure air flows in the communication passage.

According to this configuration, the bypass passage is formed in an acute angle with respect to the direction in which the high-pressure air flows in the communication passage. Therefore, the high-pressure air flowing toward the ejecting port during ejecting is hardly ejected from the opening, so that the performance of removing foreign matters is maintained.

Further, in the foreign matter removal device of the present invention, the generation unit may have a discharge port for discharging the high-pressure air.

The foreign matter removal device may further include a hose connecting the discharge port and the inlet port of the nozzle, and a connecting portion connecting the hose and the nozzle, in which a groove may be provided on an outer peripheral surface of the connecting portion, and the groove may constitute the bypass passage in a state in which the connecting portion is fitted into the inlet port of the nozzle.

According to this configuration, the connecting portion connecting the hose and the nozzle can be used to simply constitute the bypass passage.

Further, in the foreign matter removal device of the present invention, the generation unit may have a discharge port for discharging the high-pressure air.

The foreign matter removal device may further include a hose connecting the discharge port and the inlet port of the nozzle, and a connecting portion connecting the hose and the nozzle, in which an opening of the connecting portion may be smaller than the inlet port of the nozzle, and in which a gap may be formed between an outer peripheral surface of the connecting portion and an inner peripheral surface of the inlet port in a state where a portion of the connecting portion is inserted into the inlet port, and the gap may constitute the bypass passage.

According to this configuration, the connecting portion connecting the hose and the nozzle can be used to simply constitute the bypass passage.

Further, the foreign matter removal device of the present invention removes foreign matters on a lens, the foreign matter removal device including:

a generation unit for generating high-pressure air, and a nozzle for injecting the high-pressure air toward the lens, in which the nozzle has an inlet port through which the high-pressure air is introduced, an ejecting port from which the high-pressure air is ejected, and a communication passage which communicates the inlet port and the ejecting port with each other, and in which the communication passage communicates with a bypass passage via an opening smaller than the ejecting port.

According to this configuration, even when the dogging of the ejecting port of the nozzle temporarily occurs, the air intake for generating high-pressure air can be performed using the bypass passage. Further, since the opening of the bypass passage is formed smaller than the ejecting port of the nozzle, the high-pressure air flowing toward the ejecting port during ejecting is hardly ejected from the opening. Therefore, the performance of removing foreign matters is maintained.

Further, the foreign matter removal device of the present invention removes foreign matters adhering to a partition wall interposed between an in-vehicle sensor and a measuring target of the in-vehicle sensor, the foreign matter removal device including a generation unit for generating high-pressure air, and a nozzle for injecting the high-pressure air toward the partition wall, in which the nozzle has an inlet port through which the high-pressure air is introduced, an ejecting port from which the high-pressure air is ejected, and a communication passage which communicates the inlet port and the ejecting port with each other, and in which the communication passage communicates with a bypass passage via an opening smaller than the ejecting port.

Further, in the foreign matter removal device of the present invention, the generation unit may include a piston, in which the time during which the piston in the generation unit moves from the top dead center to the bottom dead center may be ten times or more the time during which the piston moves from the bottom dead center to the top dead center.

According to this configuration, the speed of the piston in the generation unit is considerably faster in a feeding direction which is a moving direction when air is fed out is considerably than the speed in a force accumulation direction which is opposite to the feeding direction and is a moving direction when air is sucked. Therefore, the moving speed of air in the communication passage is also faster at the time of exhaust than at the time of intake. With this configuration, the outflow of the high-pressure air from the bypass passage during exhaust (injection) can be suppressed to a small amount while securing the bypass function of the bypass passage, thereby maintaining the foreign matter removal performance during injection.

Further, in order to achieve the above object, the foreign matter removal device according to the present invention removes foreign matters on a lens of an in-vehicle camera attached to a vehicle so that the lens of the in-vehicle camera is exposed toward the outside of a body panel of a vehicle, the foreign matter removal device including:

a generation unit for generating high-pressure air, and a nozzle for injecting the high-pressure air toward the lens, in which a tip end of the nozzle has a first wall portion facing a front surface of the in-vehicle camera.

According to the above configuration, the tip end of the nozzle has the first wall portion facing the front surface of the in-vehicle camera. In this way, the high-pressure air sent from the generation unit flows along the first wall portion and is effectively blown on the lens of the camera, so that it is possible to maintain the performance of removing foreign matters. Further, unlike the prior art, it is not necessary to form the tip end of the nozzle with the wall portion covering the entire circumferential surface of the blow-off port of high-pressure air. Therefore, the shape of the tip end of the nozzle can be configured to achieve space saving, and mountability to the vehicle is extremely excellent.

The shape of the nozzle may be configured such that the high-pressure air flowing into the nozzle from the generation unit is injected toward the lens while hitting against the first wall portion.

According to the above configuration, by causing the high-pressure air to be fed out while hitting against the first wall portion, the high-pressure air can be rectified, so that the high-pressure air of an appropriate air volume can be sent to an appropriation location on the surface of the lens.

The tip end of the nozzle may have a pair of second wall portions extending from both side surfaces of the first wall portion toward the lens.

According to the above configuration, the air spayed from the nozzle can be more effectively directed to the lens.

The pair of second wall portions may have a shape corresponding to the shape of the front surface of the in-vehicle camera, and the nozzle may be attached to the in-vehicle camera such that the pair of second wall portions are in contact with the front surface.

According to the above configuration, a pipeline covering the entire circumferential surface of a blow-off port of the high-pressure air can be formed by the first wall portion, the second wall portions, and the front surface of the camera. Therefore, the air blown out from the nozzle can be more effectively directed to the lens, and the nozzle can be accurately positioned with the respect to the lens of the camera.

The first wall portion may have a fan-like shape enlarged toward the lens.

According to the above configuration, the high-pressure air can be substantially uniformly blown toward the entire outer surface of the lens.

At least one protrusion for rectifying the high-pressure air and blowing it to the lens may be provided on the surface of the first wall portion facing the front surface of the in-vehicle camera.

According to the above configuration, the injection direction, amount, pressure, etc. of the high-pressure air at the tip end of the nozzle are controlled by the protrusion, so that the high-pressure air can be more efficiently blown onto the lens.

The foreign matter removal device according to another example of the present invention removes foreign matters on a lens of an in-vehicle camera attached to a vehicle so that the lens of the in-vehicle camera is exposed toward the outside of a body panel of a vehicle, the foreign matter removal device including:

a reservoir for storing cleaning liquid, and a nozzle having a tip end disposed on a front surface of the lens, in which the tip end of the nozzle has a first wall portion directly facing the front surface of the in-vehicle camera, a pair of second wall portions extending from both side surfaces of the first wall portion toward the front surface, the nozzle is attached to the in-vehicle camera so that the pair of second wall portions are in contact with the front surface, and at least one protrusion for rectifying the cleaning liquid and discharging it toward the lens is provided on the surface of the first wall portion facing the front surface.

According to the above configuration, the discharging direction, flow rate, pressure, etc. of the cleaning liquid at the tip end of the nozzle are controlled by the protrusion, so that the cleaning liquid can be more efficiently blown onto the lens.

Further, the foreign matter removal device of the present invention removes foreign matters on a lens of a camera, the foreign matter removal device including a generation unit for generating high-pressure air, and a nozzle for injecting the high-pressure air toward the lens, in which a tip end of the nozzle has a first wall portion facing the lens.

According to this configuration, the tip end of the nozzle has the first wall portion facing the lens. In this way, the high-pressure air sent from the generation unit flows along the first wall portion and is effectively blown on the lens, so that it is possible to maintain the performance of removing foreign matters. Further, unlike the prior art, it is not necessary to form the tip end of the nozzle with the wall portion covering the entire circumferential surface of the blow-off port of high-pressure air. Therefore, the shape of the tip end of the nozzle can be configured to achieve space saving.

Further, the foreign matter removal device of the present invention removes foreign matters adhering to a partition wall interposed between an in-vehicle sensor and a measuring target of the in-vehicle sensor, the foreign matter removal device including a generation unit for generating high-pressure air, and a nozzle for injecting the high-pressure air toward the partition wall, in which a tip end of the nozzle has a first wall portion facing the partition wall.

Further, the vehicle of the present invention includes the foreign matter removal device described above.

According to this configuration, for example, even when an in-vehicle camera or a lens of a sensor becomes dirty due to rain, mud or the like, foreign matters on the lens can be removed by blowing high-pressure air thereto, thereby enhancing the accuracy of information obtained from the in-vehicle camera.

Effects of Invention

According to the foreign matter removal device of the present invention and the vehicle provided with the foreign matter removal device, it is possible to enhance the versatility of the foreign matter removal device at the time of being attached to the vehicle while maintaining the performance of removing foreign matters. Further, it is possible to generate high-pressure air even when the tip end of the nozzle is clogged, and to achieve space saving when attached to the vehicle.

BRIEF DESCRIPTION OF DRAWINGS

FIG. 4 is a configuration view of a high-pressure air generation unit included in the foreign matter removal device shown in FIG. 3.

FIG. 5A shows a separated state, and FIG. 5B shows a combined state.

EMBODIMENT FOR CARRYING OUT INVENTION

Hereinafter, an example of an embodiment according to the present invention will be described in detail with reference to the drawings.

A foreign matter removal device of the present invention is applied as a device for removing foreign matters such as water droplets, mud and dust adhering to a lens of an in-vehicle camera.

Figure 1A:
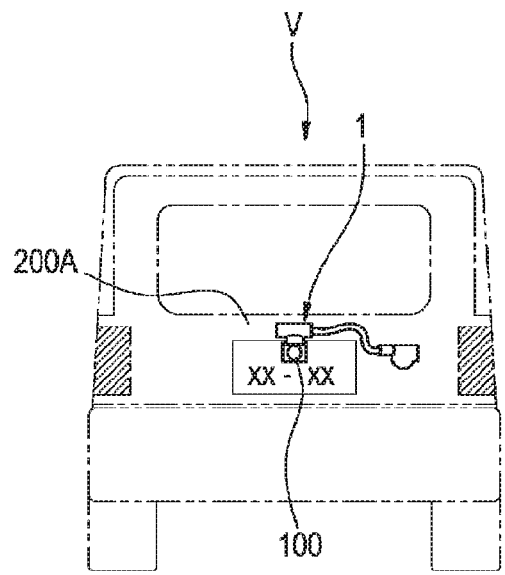
FIG. 1A is a rear view (a foreign matter removal device is shown in a perspective view) of a vehicle.
Figure 1B:
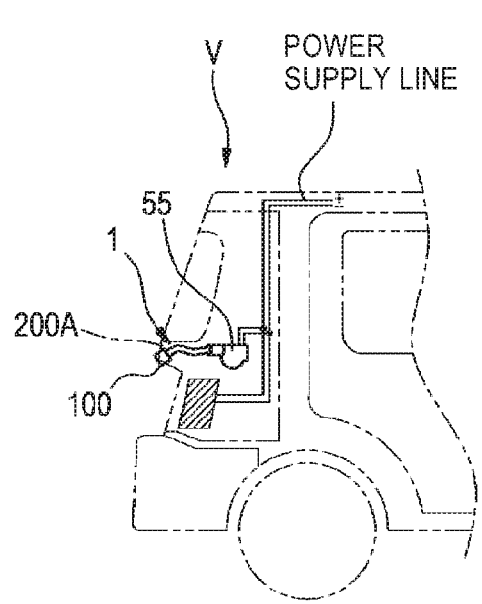
FIG. 1B is a side view (the foreign matter removal device is shown in a perspective view) of a rear part of the vehicle.

As shown in FIGS. 1A and 1B, a foreign matter removal device 1 is attached to a back door 200A of a vehicle V, for example. The foreign matter removal device 1 is provided with a motor 55, and a power supply terminal of the motor 55 is connected to a power supply line of a vehicle. For example, with the triggering that a gear of the vehicle V enters a reverse mode, a vehicle control unit (ECU: not shown) causes an in-vehicle camera 100 (to be described later) to start photographing, and the foreign matter removal device 1 is controlled to operate by the vehicle control unit (ECU) within several seconds at the start of photographing, for example.

Figure 1C:
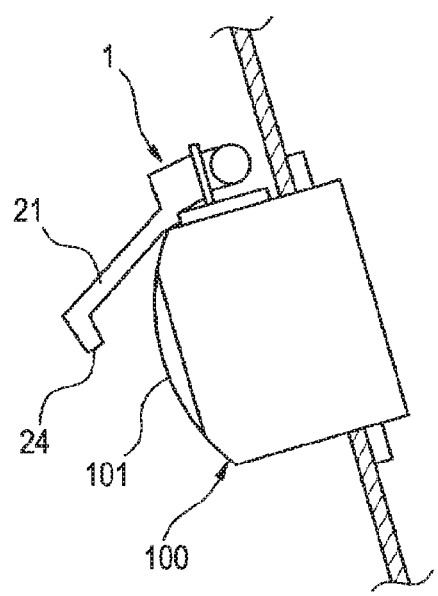
FIG. 1C is a partial enlarged view of the rear part of the vehicle.

The in-vehicle camera 100 is a camera for confirming, for example, the rear side of the vehicle V and, as shown in FIG. 1C, a lens 101 of the in-vehicle camera 100 is attached to the back door 200A so that it is exposed toward the outside of the back door 200A of the vehicle V. The in-vehicle camera 100 is provided with an imaging unit (not shown), and the lens 101 covers the imaging unit. As the lens 101, a simple translucent cover that does not converge or diffuse light is also included in the lens of this example.

Figure 2A:
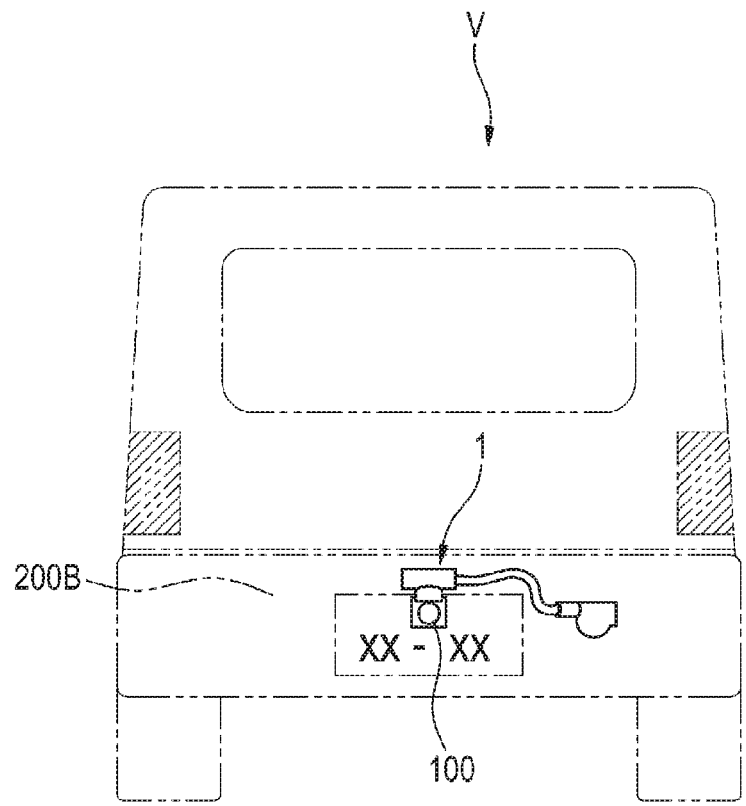
FIGS. 2A and 2B are views showing another example of a position where the foreign matter removal device is attached.
Figure 2B:
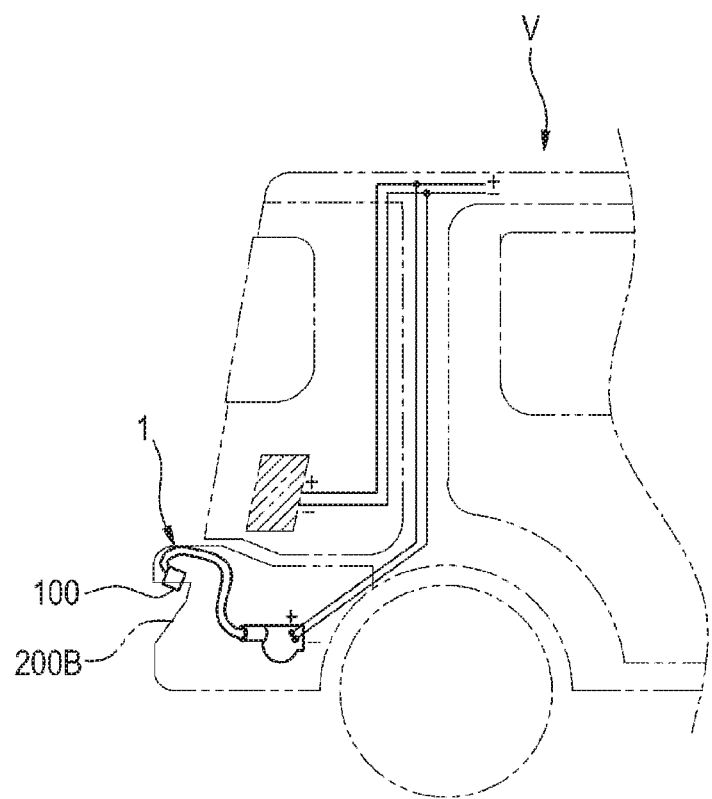

Meanwhile, as shown in FIGS. 2A and 2B, the foreign matter removal device 1 may be attached to a rear bumper 200B of the vehicle V, for example. Meanwhile, the position at which the in-vehicle camera 100 is attached is not limited to the rear end side of the vehicle but may be a body panel such as the front side or lateral side of the vehicle. Further, in this example, the meaning of the phrase, "to be attached to the body panel." includes, for example, a case where the in-vehicle camera is attached via a vehicle mounted component such as a lamp, a door knob, a mirror, a bumper attached to the body panel and a case where the in-vehicle camera is mounted as a part (as an integral body) of these components.

First Embodiment

Figure 3:
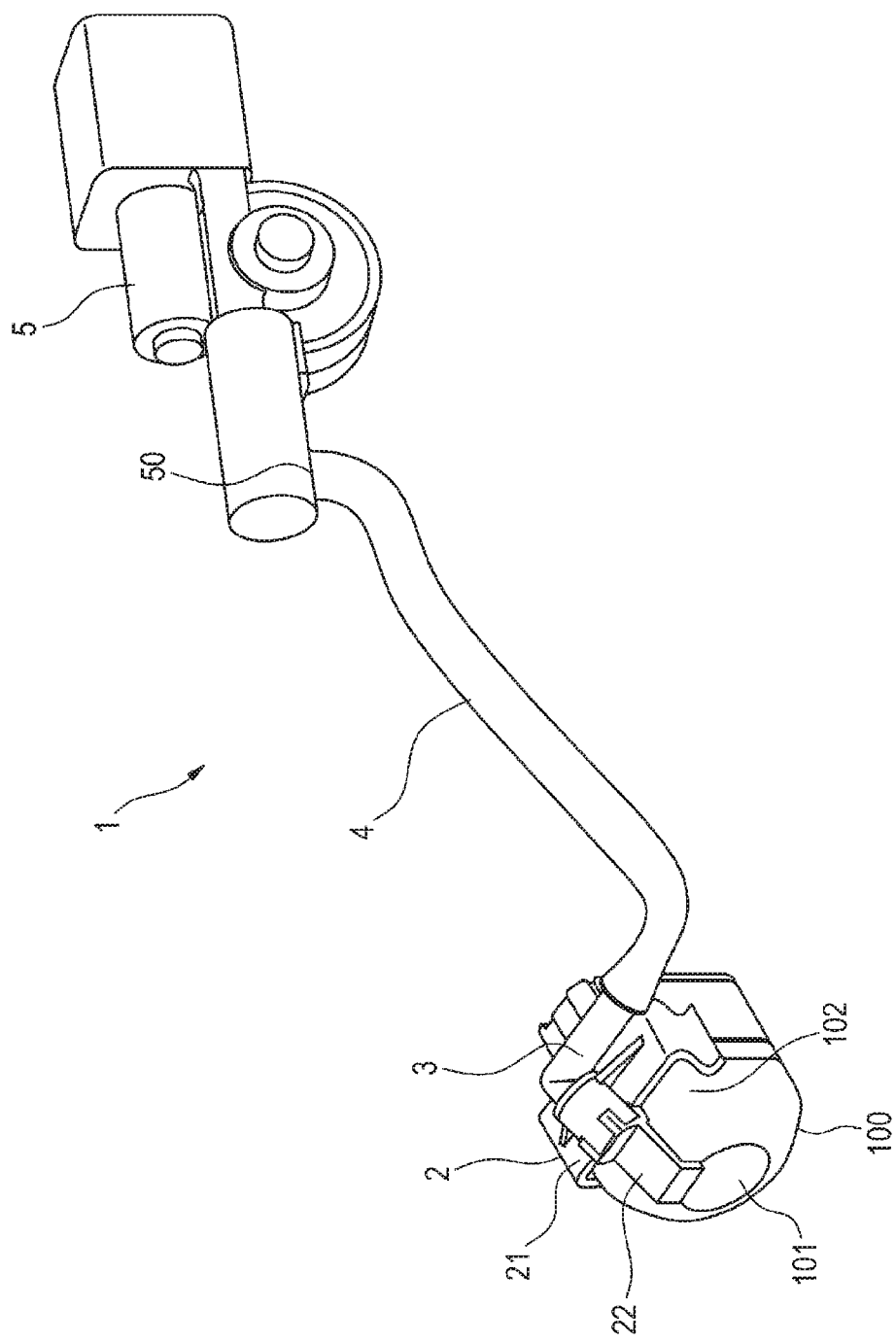
FIG. 3 is a perspective view of a foreign matter removal device according to a first embodiment of the present invention.

As shown in FIG. 3, the foreign matter removal device 1 includes a nozzle unit 2, a joint member 3, a hose 4, and a high-pressure air generation unit (an example of the generation unit) 5.

The nozzle unit 2 is configured to be removably attached to the in-vehicle camera 100. The nozzle unit 2 includes an attachment part 21 and a nozzle 22. The nozzle unit 2 is formed of resin material, for example.

The attachment part 21 is attached to a housing 102 of the in-vehicle camera 100 so as to cover a top surface of the in-vehicle camera 100. The nozzle 22 injects high-pressure air toward a lens 101 of the in-vehicle camera 100. The nozzle 22 is formed integrally with the attachment part 21. The nozzle 22 is provided in such a way that a tip end (ejection port) of the nozzle 22 faces the lens 101 when the attachment part 21 is attached to the housing 102. Here, the phrase. "formed integrally with," means that an operator can handle the nozzle 22 and the attachment part 21 as an integral part during assembly work. Specifically, for example, the nozzle 22 and the attachment part 21 may be molded of the same material and in the same mold. Alternatively the nozzle 22 and the attachment part 21 may be respectively molded of separate materials, and then, fitted together and formed integrally, thereby constituting the nozzle unit 2.

The joint member 3 is a member for joining the nozzle 22 of the nozzle unit 2 and the hose 4. One end portion of the joint member 3 is connected to the nozzle 22 and the opposite end portion thereof is connected to the hose 4. The joint member 3 is formed of resin material, for example.

The hose 4 is a piping member that connects, together with the joint member 3, the nozzle 22 and a high-pressure air generation unit 5. One end portion of the hose 4 is connected to the joint member 3 and the opposite end portion thereof is connected to a discharge port 50 of the high-pressure air generation unit 5. The hose 4 is formed of, for example, a material such as resin or rubber.

The high-pressure air generation unit 5 is a unit for generating high-pressure air to be fed to the nozzle 22. The high-pressure air generation unit 5 is attached to a part of a vehicle body at the inside of a vehicle.

As shown in FIG. 4, the high-pressure air generation unit 5 includes a case main body 51 and a moving mechanism disposed inside the case main body 51. Of a moving direction of a piston 52 in the high-pressure air generation unit 5, a rearward direction that is a direction of feeding out air refers to a feeding direction, and a forward direction that is opposite to the feeding direction refers to a force accumulation direction.

In an initial state before high-pressure air is fed out, the piston 52 is positioned on the feeding direction side, and a rack 53 is positioned in a state where a rack portion 53a is engageable with a gear portion 54a of a pinion 54.

When the driving of the motor (driving source) 55 is started and a driving force of the motor 55 is transmitted to a worm wheel 57 via a worm 56, the gear portion 54a of the pinion 54 is meshed with the rack portion 53a of the rack 53. Therefore, the rack 53 moves in the force accumulation direction against an urging force of an urging spring 58 in accordance with the rotation of the pinion 54. As the rack 53 moves in the force accumulation direction, the meshing between the gear portion 54a and the rack portion 53a is released at a predetermined position. The position (position shown in FIG. 4) where the meshing between the gear portion 54a and the rack portion 53a is released is set as the bottom dead center of the piston 52. In a state in which the piston 52 is positioned at the bottom dead center, the air (outside air) flowing into a substantially front half portion (second space) 60b of an internal space 60 of a piston support portion 59 passes through a gap 61b along a step 61a and flows toward a substantially rear half portion (first space) 60a of the internal space 60.

When the piston 52 is moved to the bottom dead center, the meshing between the gear portion 54a and the rack portion 53a is released, and the piston 52 is moved in the feeding direction at a speed higher than the moving speed in the force accumulation direction by an urging force of the urging spring 58. In this way, the air flowing from the second space 60b to the first space 60a passes through the discharge port 50 of a connection protrusion 62 from the first space 60a and is fed toward the nozzle 22 of the nozzle unit 2 via the hose 4. At this time, since the diameter of the discharge port 50 is smaller than that of the piston support portion 59, the air discharged from the first space 60a through the discharge port 50 is compressed into high-pressure air and is fed out.

Figure 5A:
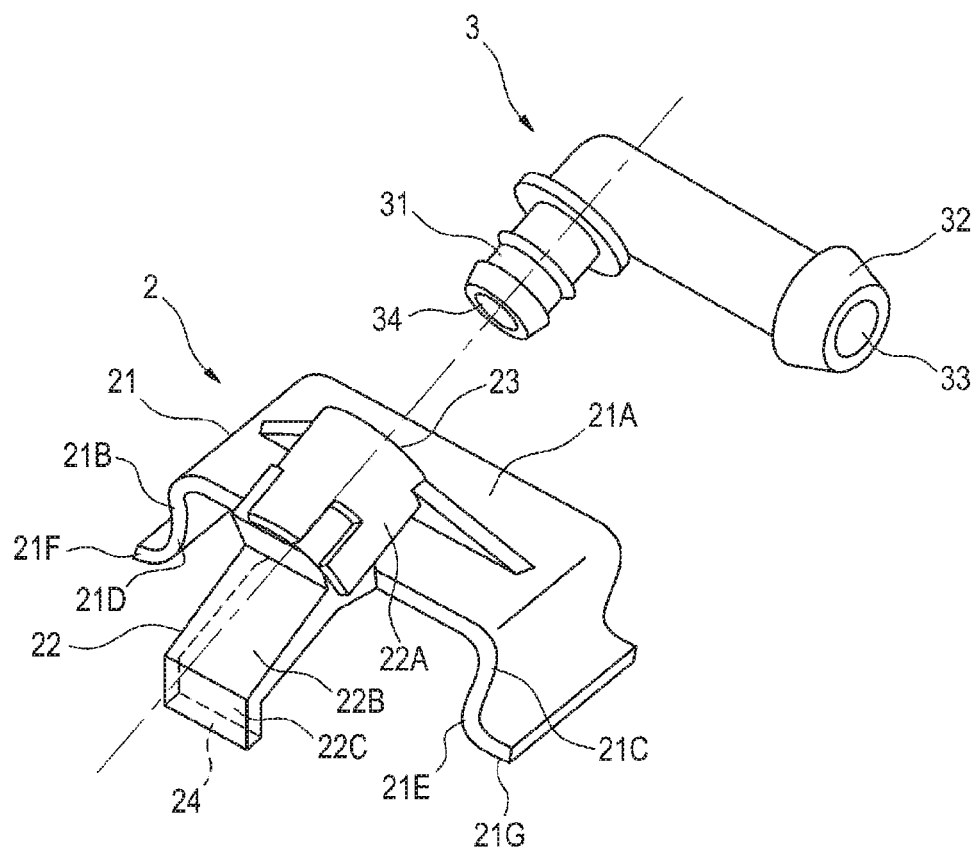
FIGS. 5A and 5B are a perspective view showing a nozzle unit and a joint member.

As shown in FIG. 5A, the attachment part 21 of the nozzle unit 2 has a substantially rectangular top plate 21A and two side plates 21B, 21C. The side plate 21B is continuous to one end portion of the top plate 21A and is provided so as to protrude on the lower surface side of the top plate 21A. The side plate 21C is positioned on the side opposite to the side plate 21B. The side plate 21C is continuous to the other end portion of the top plate 21A and is provided so as to protrude on the lower surface side of the top plate 21A. Further, a contact portion 21D of the side plate 21B and a contact portion 21E of the side plate 21C are curved so as to slightly protrude inward, and a lower end portion 21F of the side plate 21B and a lower end portion 21G of the side plate 21C are inclined so as to slightly spread outward. As the resin constituting the attachment part 21, a material excellent in elasticity is used.

The nozzle 22 of the nozzle unit 2 has a connecting portion 22A, an extending portion 22B, and an ejecting portion 22C. The connecting portion 22A is a portion to which the joint member 3 is connected. The connecting portion 22A is provided with an inlet port 23 into which high-pressure air flows. The extending portion 22B is a portion that communicates the connecting portion 22A and the ejecting portion 22C with each other. The ejecting portion 22C is a portion from which high-pressure air is ejected. The ejecting portion 22C is provided with an ejecting port 24 which opens horizontally (e.g., in a rectangular shape or in an elliptical shape, etc.). The high-pressure air flowing into the inlet port 23 of the connecting portion 22A passes through a communication passage formed in the connecting portion 22A, the extending portion 22B, and the ejecting portion 22C and is ejected from the ejecting port 24 of the ejecting portion 22C. The nozzle 22 is disposed at the center on the top plate 21A of the attachment part 21.

The joint member 3 is formed of a cylindrical member having an L shape. The joint member 3 has a connecting portion 31 connected to the nozzle 22 and a connecting portion 32 connected to the hose 4. The connecting portion 32 is provided with an inlet port 33 into which high-pressure air flows. The connecting portion 31 is provided with an outlet port 34 from which high-pressure air flows. A connecting passage connecting the inlet port 33 and the outlet port 34 is formed in the joint member 3.

Figure 5B:
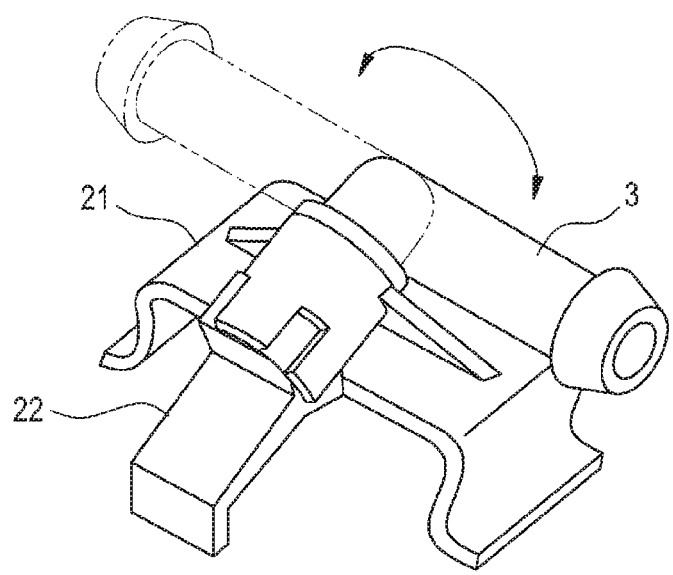

As shown in FIG. 5B, the joint member 3 is connected to the nozzle 22 by fitting the connecting portion 31 into the inlet port 23 of the nozzle 22. In a state of being connected to the nozzle 22, the joint member 3 is rotatable about the connecting portion 31 as an axis so that its posture with respect to the nozzle 22 can be changed.

Figure 6:
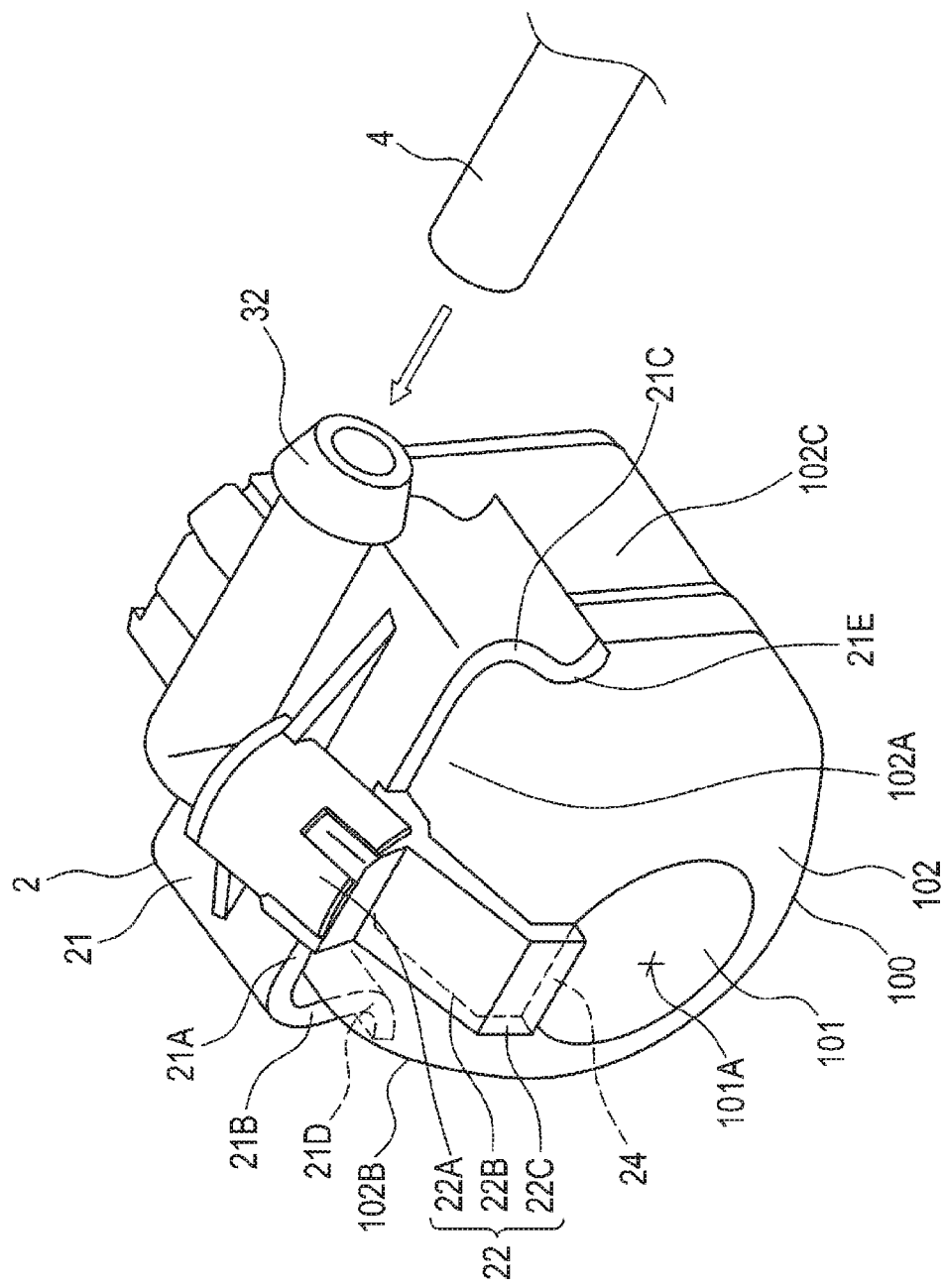
FIG. 6 is a perspective view showing the nozzle unit attached to an in-vehicle camera.
Figure 7:
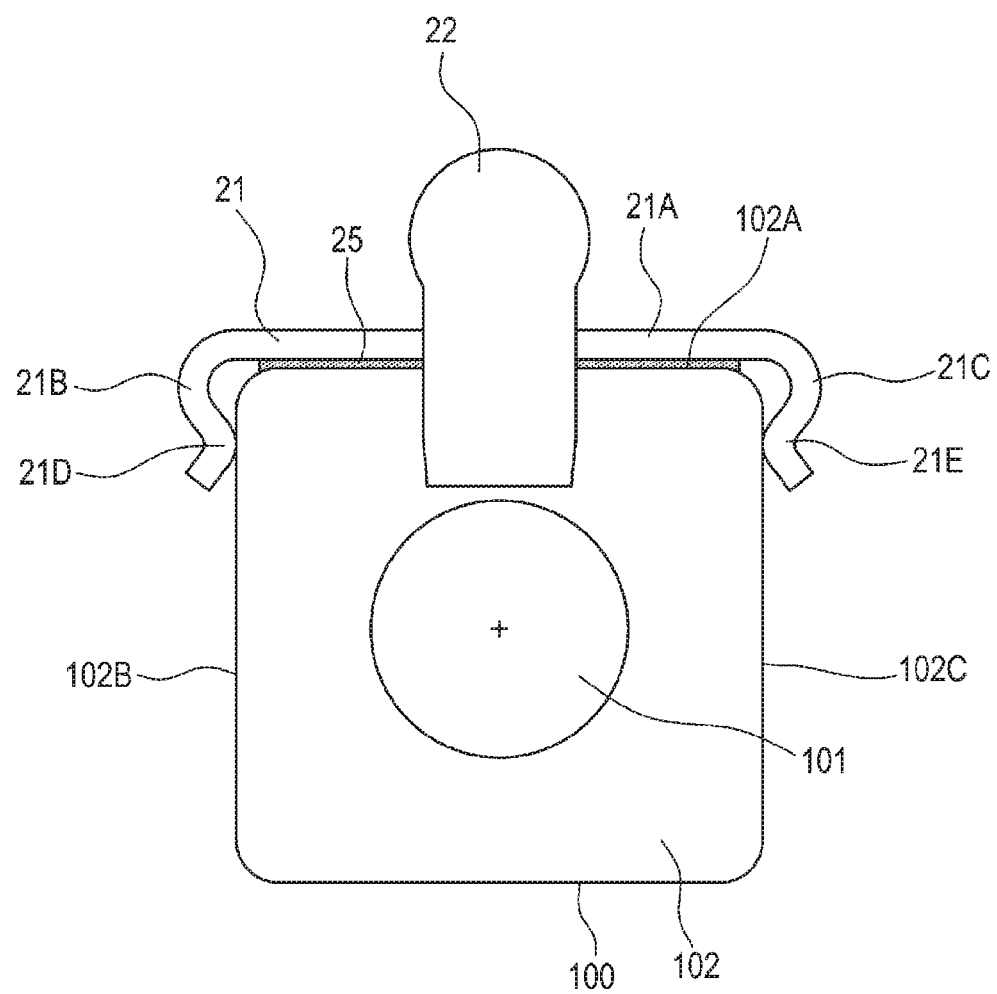
FIG. 7 is a view showing an example of attaching the nozzle unit to the in-vehicle camera.

As shown in FIGS. 6 and 7, the housing 102 of the in-vehicle camera 100 is formed in a cube shape, for example. The housing 102 has an upper surface (an example of the first surface) 102A, a right surface (an example of the second surface) 102B continuous with one end of the upper surface 102A, and a left surface (an example of the third surface) 102C positioned on the side opposite to the right surface 102B and continuous with the other end of the upper surface 102A.

The nozzle unit 2 is attached to the in-vehicle camera 100 in such a manner that the attachment part 21 is fitted to the housing 102 from above. In a state of being attached to the housing 102, an inner surface (an example of the opposing surface) of the top plate 21A of the attachment part 21 faces the upper surface 102A of the housing 102. The top plate 21A is adhered to the upper surface 102A of the housing 102 via an adhesive member 25 such as an adhesive agent or a double-sided tape. The side plate 21B is elastically deformable in a direction away from the right surface 102B of the housing 102. The contact portion (an example of the first contact portion) 21D of the side plate 21B comes into contact with the right surface 102B to press the right surface 102B. Similarly, the contact portion (an example of the second contact portion) 21E of the side plate 21C comes into contact with the left surface 102C to press the left surface 102C. In this way, the side plate 21B and the side plate 21C of the attachment part 21 sandwich the housing 102 from both the left and right sides.

The nozzle 22 is positioned so that the extending portion 22B is disposed toward the lens 101 so as to extend along a shoulder portion of the front surface of the housing 102, and the ejecting port 24 of the ejecting portion 22C faces a center 101A of the lens 101. Further, in the joint member 3, the connecting portion 32 is connected to the hose 4.

Next, an operation of the foreign matter removal device 1 will be described.

When the driving of the motor 55 in the high-pressure air generation unit 5 is started, first, air (outside air) for generating high-pressure air is sucked. The air is sucked into the high-pressure air generation unit 5 from the ejecting port 24 of the nozzle 22. The sucked air is fed out, as high-pressure air, from the discharge port 50 of the high-pressure air generation unit 5 to the hose 4 by piston motion due to an urging force of the urging spring 58. The high-pressure air is fed from the hose 4 to the nozzle 22 of the nozzle unit 2 through the joint member 3.

The high-pressure air flows into the inlet port 23 (see FIG. 5) of the nozzle 22 and is ejected from the ejecting port 24 through the communication passage. The high-pressure air ejected from the ejecting port 24 is blown toward the lens 101 of the in-vehicle camera 100. In this way, foreign matters adhering to the lens 101 are blown away, so that the dirt of the lens 101 is eliminated.

By the way, in the configuration in which a foreign matter removal device is attached to a panel of a vehicle via a dedicated bracket as in the conventional foreign matter removal device and a nozzle is positioned with respect to a lens of a camera, it is necessary to position the camera and the nozzle while respectively attaching them to a body panel of a vehicle. In this case, a mounting error respectively occurs in both the camera and the nozzle, and the sum of both errors is generated as a positional deviation of the nozzle with respect to the lens of the camera. Further, since the shape of a body panel (appearance) of a vehicle is different, it is necessary to prepare a dedicated bracket according to the manufacturer and the type of the vehicle. Therefore, the versatility of a foreign matter removal device at the time of being attached to a vehicle is low.

On the contrary, according to the foreign matter removal device 1 of the present embodiment, the nozzle 22 is formed integrally with the attachment part 21, and the attachment part 21 is attached to the housing 102 of the in-vehicle camera 100. Since it is unnecessary to attach and position the nozzle 22 with respect to a body panel of a vehicle, the tip end of the nozzle 22 can be accurately positioned with respect to the lens 101 of the in-vehicle camera 100, and thus, it is possible to enhance the performance of removing foreign matters adhering to the lens 101.

Further, the nozzle unit 2 is configured such that the ejecting port 24 of the nozzle 22 faces the center of the lens 101 when the attachment part 21 is attached to the housing 102 of the in-vehicle camera 100. Therefore, the positioning accuracy of the nozzle 22 with respect to the lens 101 of the in-vehicle camera 100 can be further enhanced, so that the performance of removing foreign matters can be enhanced.

Further, in the attachment part 21 of the nozzle unit 2, the top plate 21A is adhered to the housing 102 by the adhesive member 25, and the side plates 21B, 21C are elastically deformed to be brought into contact with the housing 102. Therefore, the attachment part 21 is firmly fixed to the housing 102 by the adhesive member 25 and is fixed to the housing 102 of the in-vehicle camera 100 in a state of being deformed along the shape of the housing 102. Thus, the ejecting port 24 of the nozzle 22 can be more accurately positioned with respect to the lens 101 of the in-vehicle camera 100, so that the performance of removing foreign matters can be enhanced.

Further, the shape of the housing 102 of the in-vehicle camera 100 to which the attachment part 21 is attached is small in size difference between products, compared to the shape of a body panel of a vehicle. Since the side plates 21B, 21C can be elastically deformed and attached also to cameras having slightly different lateral widths of the housing 102, it is unnecessary to prepare a dedicated bracket or the like, and thus, the versatility of the foreign matter removal device 1 at the time of being attached to a vehicle can be enhanced.

Further, the joint member 3 connected to the nozzle 22 is configured so that its posture with respect to the nozzle 22 can be changed. Therefore, even when the arrangement place of the high-pressure air generation unit 5 in a vehicle differs depending on the type of the vehicle, the joint member 3 can be connected to the hose 4 by changing the posture of the joint member 3. Thus, the nozzle unit 2 and the high-pressure air generation unit 5 can be easily connected to each other via the joint member 3, so that the versatility of the foreign matter removal device 1 at the time of being attached to a vehicle can be further enhanced.

Further, since the nozzle 22 can be attached to the in-vehicle camera 100 via the nozzle unit 2 without using a dedicated bracket, an increase in product cost can be suppressed.

Figure 8:
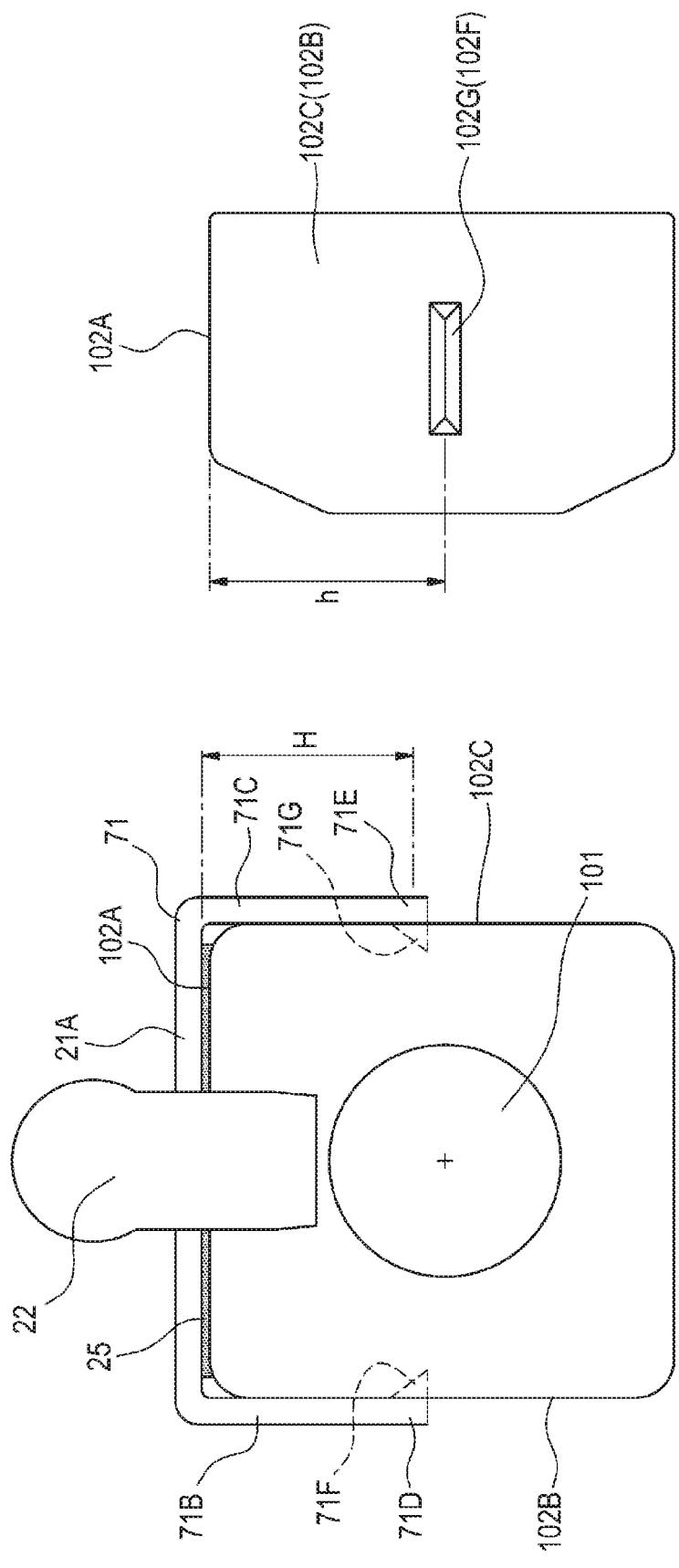
FIGS. 8A and 8B are a view for explaining a modified example of an attachment part included in the nozzle unit.

Net, a modified example of the attachment part 21 in the above-described embodiment will be described with reference to FIG. 8.

As shown in FIG. 8A, an attachment part 71 of the modified example is different from the attachment part 21 (see FIG. 7) in a structure of a side plate 71B and a side plate 71C. Meanwhile, since the parts denoted by the same reference numerals as those in the above-described embodiment have the same functions and operations, a duplicated description thereof will be omitted.

The side plate 71B is continuous to one end portion of the top plate 21A and is provided so as to protrude in a direction perpendicular to the top plate 21A on the lower surface side of the top plate 21. The side plate 71C is positioned on the side opposite to the side plate 71B. The side plate 71C is continuous to the other end portion of the top plate 21A and is provided so as to protrude in the direction perpendicular to the top plate 21A on the lower surface side of the top plate 21A. The side plate 71B and the side plate 71C are elastically deformable in directions away from a right surface 102B and a left surface 102C of the housing 102, respectively.

A convex portion 71F and a convex portion 71G are provided on a lower end portion 71D of the side plate 71B and a lower end portion 71E of the side plate 71C, respectively. The convex portion 71F and the convex portion 71G are provided so as to face each other on the inside of the side plate 71B and the side plate 71C. Further, the convex portion 71F and the convex portion 71G are provided so as to extend in a single line in the width direction of the side plate 71B and the side plate 71C, for example.

As shown in FIG. 8B, the left surface 102C and the right surface 102B of the housing 102 are provided with a concave portion 102G and a concave portion 102E A distance h from the upper surface 102A to the concave portion 102G and the concave portion 102F of the housing 102 is equal to a distance H from the lower surface of the top plate 21A to the convex portion 71F and the convex portion 71G of the attachment part 71.

According to this configuration, the attachment part 71 of the nozzle unit 2 is fixed to the housing 102 of the in-vehicle camera 100 in a state in which the convex portion 71F and the convex portion 71G of the attachment part 71 are respectively engaged with the concave portion 102G and the concave portion 102F of the housing 102, and the side plate 71B and the side plate 71C are in surface contact with the housing 102. Therefore, the tip end of the nozzle 22 can be more accurately positioned with respect to the lens 101 of the in-vehicle camera 100 in the front, rear, left and right directions of the camera Meanwhile, as a modified example, it is also possible to adopt an engagement structure in which the convex portions are provided in the housing 102 and the concave portions are provided in the side plates. Further, as shown in FIG. 9, according to the configuration in which the nozzle unit is attached by engagement, it is also possible not to use the adhesive member.

First Modified Example

Next, a modified example (first modified example) of the nozzle 22 in the above-described embodiment will be described with reference to FIGS. 9 to 11.

Figure 9:
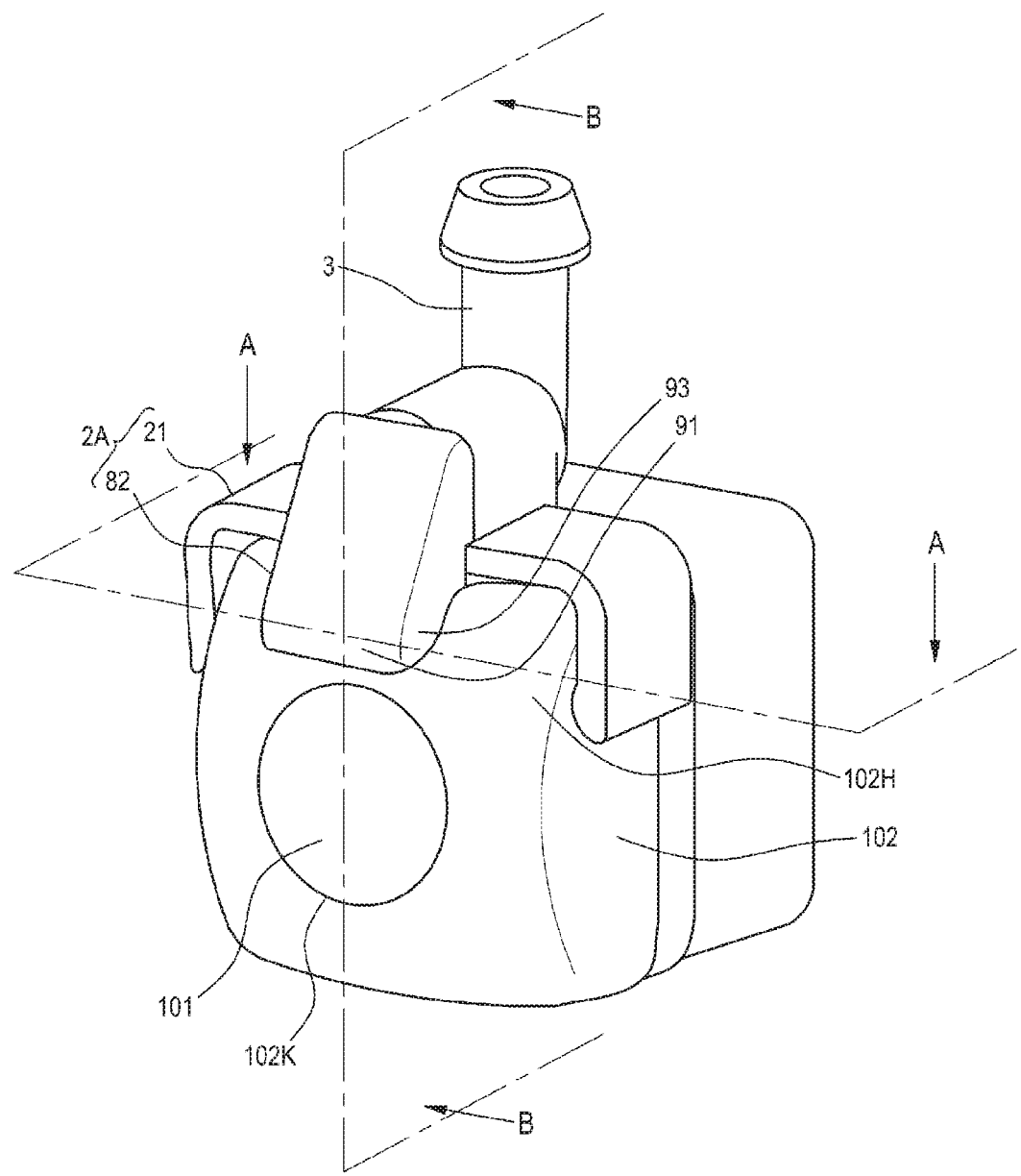
FIG. 9 is a view for explaining a modified example (first modified example) of a nozzle included in the nozzle unit.

FIG. 9 shows a nozzle unit 2A attached to the in-vehicle camera 100. FIG. 10 shows a transverse sectional view taken along the arrow A-A in FIG. 9, and FIG. 11 shows a longitudinal sectional view taken along the arrow B-B in FIG. 9. A nozzle 82 of the modified example is different from the nozzle 22 (see FIG. 6) in a structure of an ejecting portion 82C. Meanwhile, since the parts denoted by the same reference numerals as those in the above-described embodiment have the same functions and operations, a duplicated description thereof will be omitted.

The nozzle unit 2A includes the attachment part 21 and the nozzle 82.

The nozzle 82 has the connecting portion 22A, the extending portion 22B, and the ejecting portion 82C. The ejecting portion 82C is a portion from which high-pressure air is ejected, and is provided with the ejecting port 24. The high-pressure air flowing into the inlet port 23 passes through a communication passage formed by the connecting portion 22A, the extending portion 22B and the ejecting portion 82C and is ejected from the ejecting port 24.

The housing 102 of the in-vehicle camera 100 has a front surface (an example of the camera front surface) 102H continuous with one end of each of the upper surface 102A, the right surface 102B and the left surface 102C. The front surface 102H is a plan view area when viewing the housing 102 as a single body from the front. The front surface 102H is provided with a lens hole 102K at which the lens 101 is exposed.

The ejecting portion 82C has a top wall 91 facing the front surface 102H of the housing 102, and two side walls 92, 93. The side wall 92 is continuous to one end portion of the top wall 91 and is provided so as to protrude in a direction away from the top wall 91. The side wall 93 is positioned on the side opposite to the side wall 92. The side wall 93 is continuous to the other end portion of the top wall 91 and is provided so as to protrude in a direction away from the top wall 91. In this way, the ejecting portion 82C of the nozzle 82 is constituted by the top wall 91 and the side walls 92, 93, and a wall (bottom wall) facing the top wall 91 is not formed.

Figure 10:
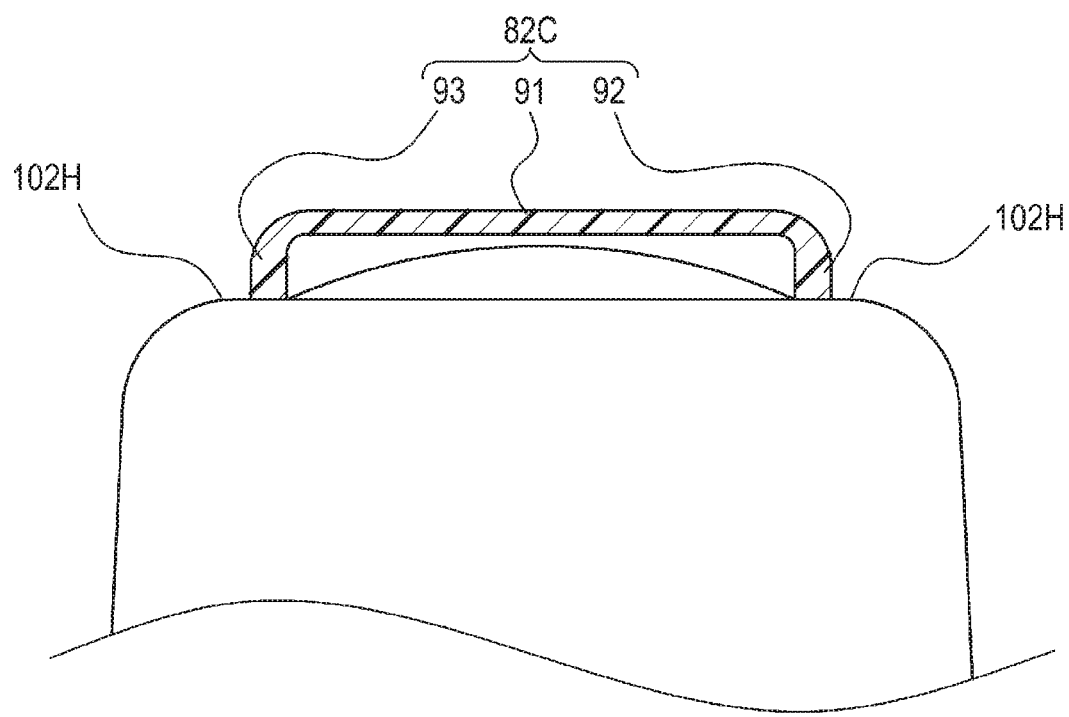
FIG. 10 is a transverse sectional view taken along the line A-A in FIG. 9.
Figure 11:
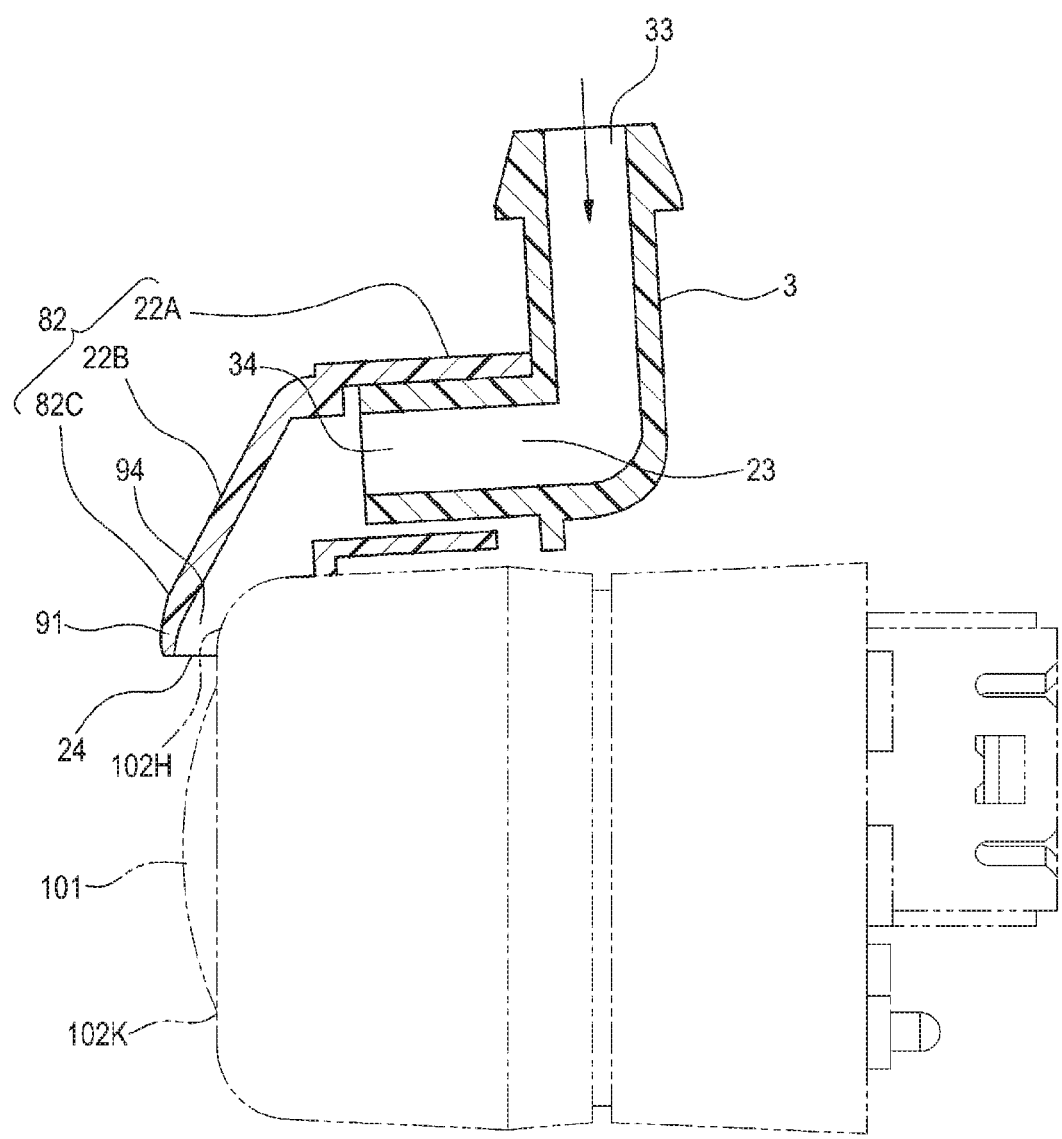
FIG. 11 is a longitudinal sectional view taken along the line B-B in FIG. 9.

In a state in which the attachment part 21 is attached to the housing 102 of the in-vehicle camera 100, the nozzle 82 is configured such that the side walls 92, 93 (an example of the positioning portion) of the ejecting portion 82C come into contact with the front surface 102H of the housing 102 (see FIG. 10). As the side walls 92, 93 come into contact with the front surface 102H, the nozzle 82 is positioned with respect to the front surface 102H of the housing 102. Further in the state in which the attachment part 21 is attached to the housing 102, a communication passage 94 surrounded by the top wall 91, the side walls 92, 93 and the front surface 102H of the housing 102 is formed in the ejecting portion 82C (see FIG. 11). The high-pressure air is ejected from the ejecting port 24 through the communication passage 94.

According to this configuration, the nozzle unit 2A is fixed to the housing 102 of the in-vehicle camera 100 by the attachment part 21, and is also fixed by the side walls 92, 93 of the nozzle 82. Specifically, the tip end of the nozzle 82 can be accurately positioned with respect to the lens 101 of the in-vehicle camera 100 not only in the left and right direction but also in the front and rear direction of the camera. Further, since the ejecting portion 82C is not provided with a bottom wall, the thickness of the nozzle 82 can be reduced, and it is possible to suppress an increase in the size of the nozzle unit 2A.

Second Embodiment

Figure 12A:
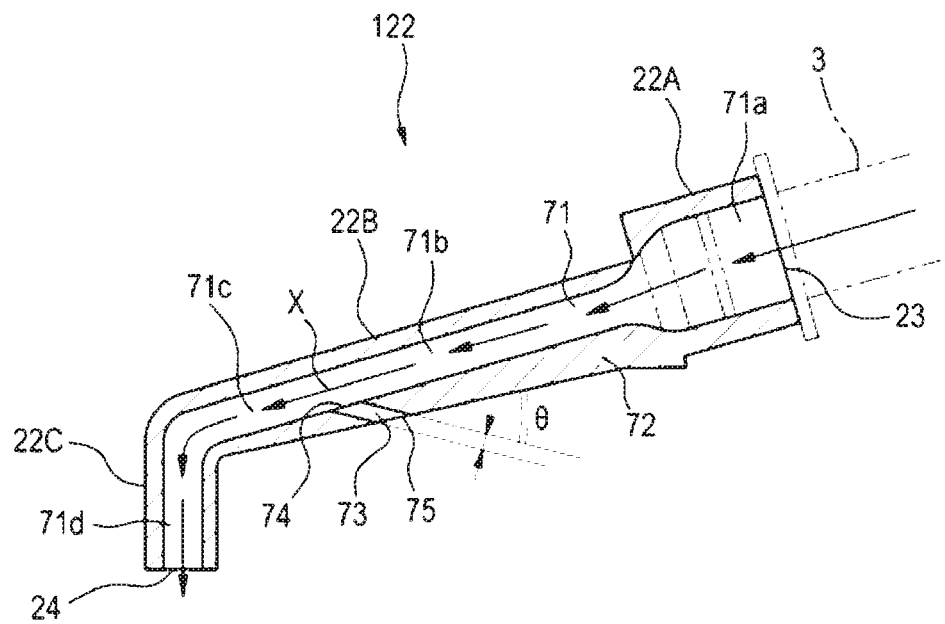
FIGS. 12A and 12B are sectional views for explaining a bypass passage formed in a nozzle according to a second embodiment.
Figure 12B:
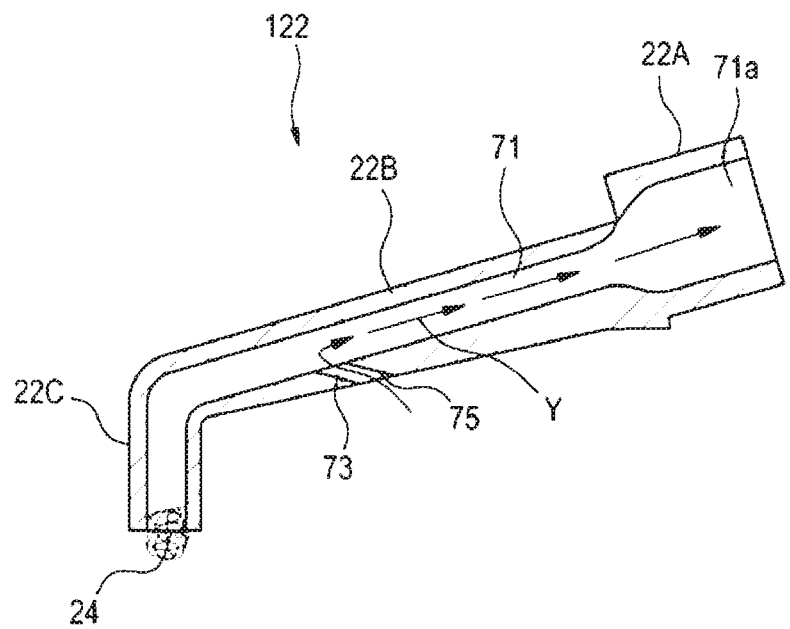

FIGS. 12A and 12B are sectional views for explaining a bypass passage formed in a nozzle included in a foreign matter removal device according to a second embodiment.

As shown in FIG. 12A, a communication passage 71 for communicating the inlet port 23 and the ejecting port 24 with each other, and a bypass passage 73 penetrating a lower wall 72 of the extending portion 22B are formed in a nozzle 122 included in the foreign matter removal device according to the second embodiment.

The communication passage 71 is composed of a pipeline 71a of the connecting portion 22A, pipelines 71b, 71c of the extending portion 22B, and a pipeline 71d of the ejecting portion 22C. The pipeline 71b means a pipeline from an end of the pipeline 71a to a place where the bypass passage 73 is formed. The pipeline 71c means a pipeline from the place where the bypass passage 73 is formed to the beginning of the pipeline 71d.

A sectional area (sectional area of the section orthogonal to flow an example of the size of the pipeline) of the pipeline 71c is slightly larger than that of the pipeline 71b. A sectional area of the pipeline 71d (ejecting port 24) is equal to that of the pipeline 71c. A sectional area of the pipeline 71a is larger than that of the pipeline 71d. Meanwhile, an inner diameter of the pipeline 71a is equal to an outer diameter of the connecting portion 31 of the joint member 3 to be fitted into the inlet port 23. Meanwhile, the size relationship of the pipelines and the openings may be defined by comparison of the maximum outer diameters or may be defined by comparison of other indexes.

The bypass passage 73 communicates with the communication passage 71 via an opening 74 formed in the lower wall 72. In the present example, a sectional area of the bypass passage 73 is equal to that of the opening 74. The sectional area of the opening 74 is smaller than that of the pipeline 71d (ejecting port 24) and that of the pipeline 71b. The bypass passage 73 is formed to have an acute angle θ with respect to the lower wall 72. An arrow X in FIG. 12A represents a direction in which the high-pressure air flows in the communication passage 71. In other words, the bypass passage 73 is formed so as to merge in an acute angle direction from the rear side with respect to the direction of the arrow X.

Next an operation of the foreign matter removal device according to the second embodiment will be described.

When the driving of the motor 55 in the high-pressure air generation unit 5 is started, air (outside air) for generating high-pressure air is sucked in accordance with the movement of the rack 53 in the force accumulation direction (see FIG. 4). The air is introduced from the ejecting port 24 of the nozzle 122 via the communication passage 71 and is introduced from a bypass port 75 via the bypass passage 73. The introduced air is sucked into the high-pressure air generation unit 5 from the joint member 3 through the hose 4. The sucked air is fed out, as high-pressure air, from the discharge port 50 of the high-pressure air generation unit 5 to the hose 4 by piston motion due to an urging force of an urging spring. The high-pressure air is fed from the hose 4 to the nozzle 122 through the joint member 3.

As shown in FIG. 12A, the high-pressure air flows into the inlet port 23 of the nozzle 122 and is ejected from the ejecting port 24 through the communication passage 71 as indicated by the arrow X. In the present example, the ejecting port 24 is formed to be larger than the opening 74 and the bypass passage 73 is formed in the acute angle (θ) direction with respect to the flowing direction of the high-pressure air, so that the high-pressure air is fed through the communication passage 71 as indicated by the arrow X.

The high-pressure air ejected from the ejecting port 24 is blown toward the lens 101 of the in-vehicle camera 100. In this way, foreign matters adhering to the lens 101 are blown away, so that the dirt or the like of the lens 101 is eliminated.

By the way, when the temporary clogging of the ejecting port 24 occurs due to dust and dirt or the like adhering to the ejecting port 24, the air to be sucked into the high-pressure air generation unit 5 is introduced from the bypass port 75 and is sucked into the high-pressure air generation unit 5 through the bypass passage 73 and the communication passage 71, as indicated by an arrow Y in FIG. 12B.

According to this configuration, the nozzle 122 is provided with the ejecting port 24 and the bypass passage 73 communicating with the communication passage 71 via the opening 74. Therefore, even when the clogging of the ejecting port 24 of the nozzle 122 temporarily occurs, outside air (air) for generating high-pressure air can be sucked via the bypass passage 73. In this way, it is possible to generate high-pressure air even when the clogging of the ejecting port 24 occurs. Further, the clogging of the ejecting port 24 can be solved by the generated high-pressure air, so that a favorable ejecting state of the high-pressure air can be secured. Further since the opening 74 of the bypass passage 73 is formed smaller than the ejecting port 24 of the nozzle 122, the high-pressure air flowing toward the ejecting port 24 during ejecting is hardly ejected from the opening 74. Therefore, the performance of removing foreign matters by the nozzle 122 is maintained even when the nozzle 122 is provided with the bypass passage 73 in addition to the ejecting port 24.

Further, the bypass passage 73 is formed in the acute angle (θ) with respect to the flowing direction (direction of the arrow X shown in FIG. 12A) of the high-pressure air in the communication passage 71. Therefore, the high-pressure air flowing toward the ejecting port 24 during ejecting hardly flows to the direction of the bypass passage 73, and thus, the high-pressure air hardly flows out from the opening. As a result, the performance of removing foreign matters by the nozzle 122 is maintained even when the nozzle 122 is provided with the bypass passage 73 in addition to the ejecting port 24.

Second Modified Example

Next, a modified example (second modified example) of the bypass passage 73 in the above-described embodiment will be described with reference to FIGS. 13 to 15.

Figure 13:
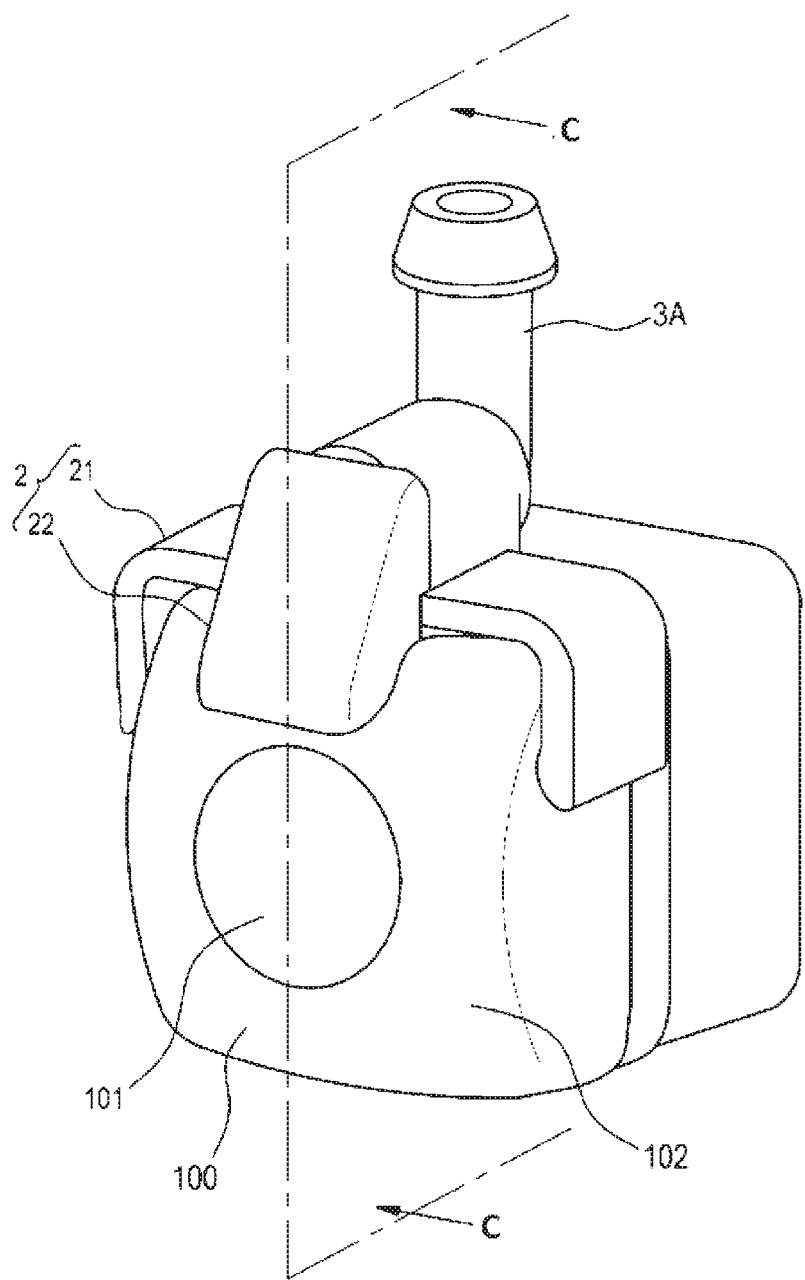
FIG. 13 is a perspective view for explaining a modified example (second modified example) of the bypass passage.

FIG. 13 shows the nozzle unit 2 attached to the in-vehicle camera 100 and a joint member (an example of the connecting portion) 3A connected to the nozzle 22 of the nozzle unit 2. FIG. 14 shows a longitudinal sectional view taken along the arrow C-C in FIG. 13. FIG. 15A is a sectional view taken along the arrow D-D in FIG. 14, and FIG. 15B shows a perspective view of a nozzle-side connecting portion 31A (referred to as a "nozzle connecting portion" in this example) of the joint member 3A as seen from the lower surface side.

A bypass passage 73A of the second modified example is different from the bypass passage 73 (see FIG. 12) formed to pentrate the lower wall 72 of the nozzle 122 in that the bypass passage 73A is formed in the nozzle connecting portion 31A of the joint member 3A. Meanwhile, since the parts denoted by the same reference numerals as those in the above-described embodiment have the same functions and operations, a duplicated description thereof will be omitted.

The nozzle connecting portion 31A of the joint member 3A of the present example has a rectangular cross-section, as shown in FIG. 15A. Further, a connecting passage 81 (passage connecting the inlet port 33 and the outlet port 34) having a rectangular shape is formed in the nozzle connecting portion 31A A groove 83 forming a part of the bypass passage 73A is provided on an outer peripheral surface of a lower wall 82 constituting the nozzle connecting portion 31A. The groove 83 has a semicircular cross-section, for example. The groove 83 is provided so as to extend in a single line in a length direction of the nozzle connecting portion 31A.

Figure 14:
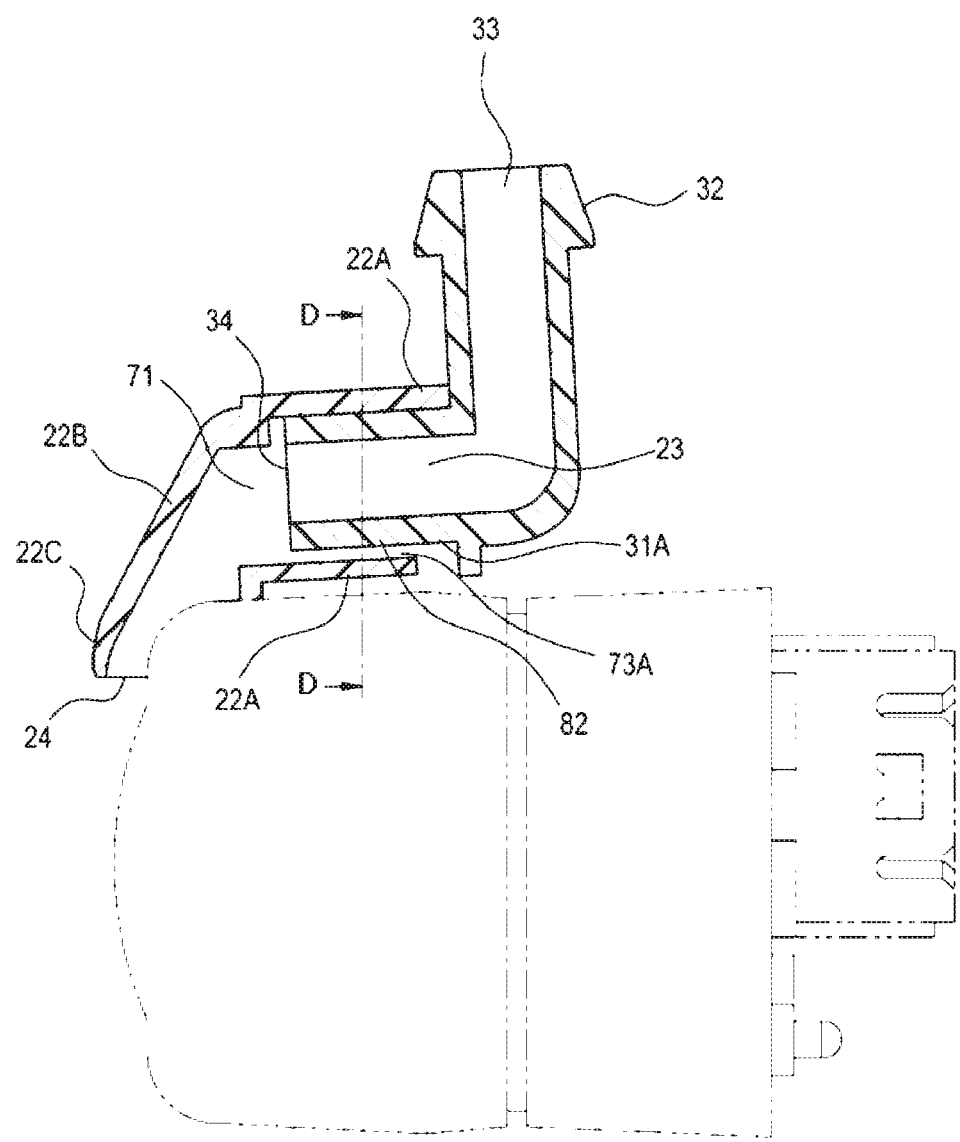
FIG. 14 is a sectional view taken along the line C-C in FIG. 13.
Figure 15A:
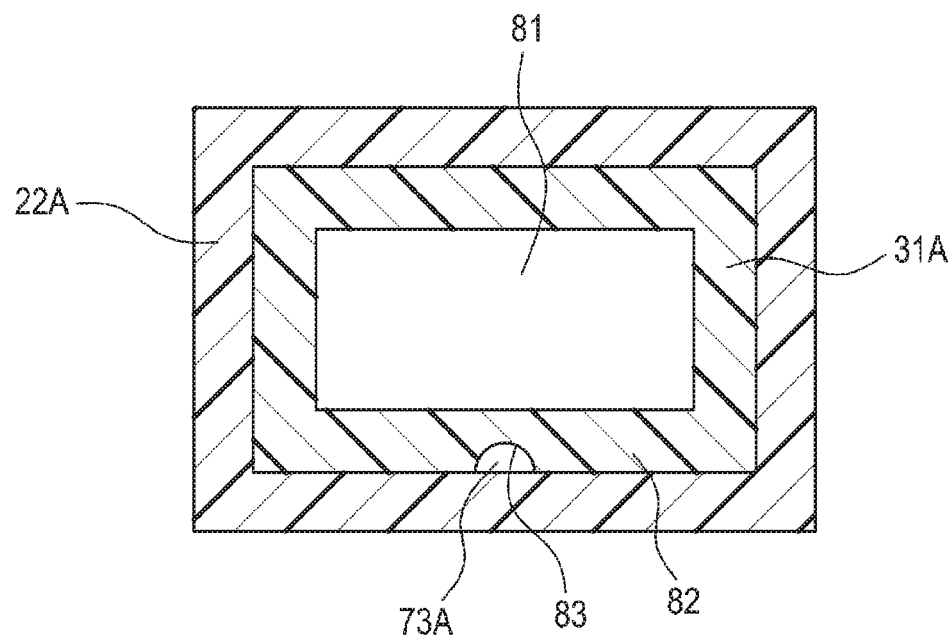
FIG. 15A is a sectional view taken along the line D-D in FIG. 14.
Figure 15B:
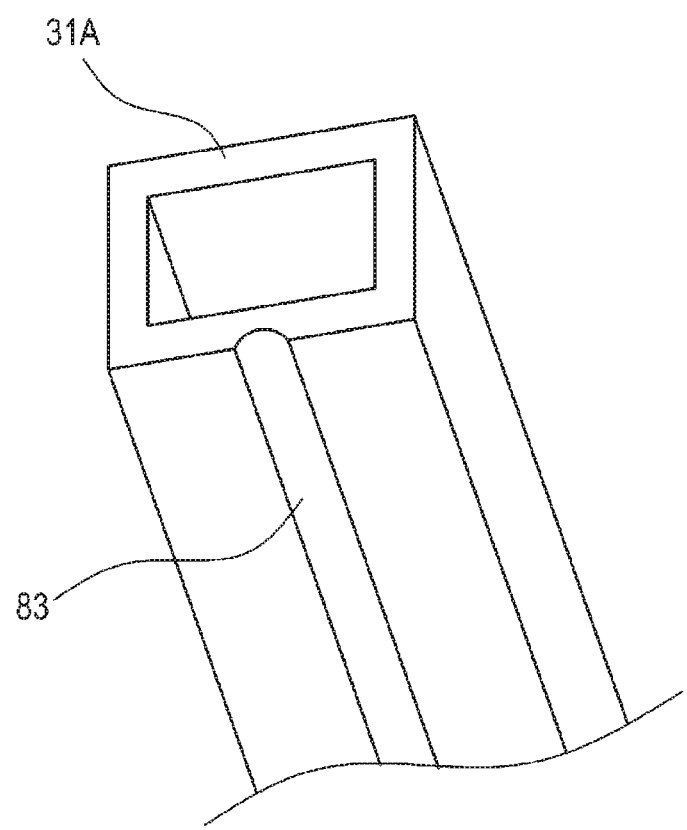
FIG. 15B is a perspective view of a joint member as seen from the lower surface side.

As the nozzle connecting portion 31A of the joint member 3A having such a configuration is fitted into the inlet port 23 of the nozzle 22, the bypass passage 73A is formed by the groove 83 of the nozzle connecting portion 31A and an inner peripheral surface of the connecting portion 22A of the nozzle 22, as shown in FIG. 14. The bypass passage 73A is connected to the communication passage 71 in the nozzle 22. A sectional area of the bypass passage 73A is smaller than that of the ejecting port 24 of the nozzle 22. Meanwhile, the function and operation of the bypass passage 73A are similar to those of the bypass passage 73 (see FIG. 12) described in the above embodiment.

According to this configuration, it is possible to simply configure the bypass passage 73A by connecting the nozzle 22 and the hose 4 and using the joint member 3A detachably provided. Further, since the bypass passage 73A is smaller than the ejecting port 24, the performance of removing foreign matters by the nozzle 22 is maintained even when the nozzle 22 is provided with the bypass passage 73A in addition to the ejecting port 24. Further, even when the dogging of the ejecting port 24 of the nozzle 22 occurs, outside air (air) can be sucked through the bypass passage 73A, and high-pressure air can be generated.

Third Modified Example

Next, another modified example (third modified example) of the bypass passage 73 in the above-described embodiment will be described with reference to FIGS. 16 and 17.

Figure 16A:
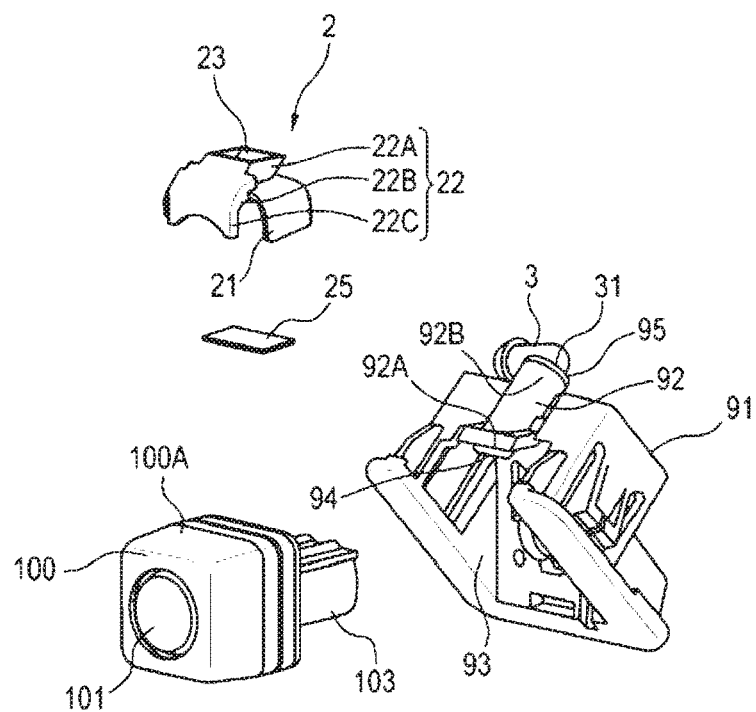
FIGS. 16A and 16B are perspective views for explaining another modified example (third modified example) of the bypass passage.
Figure 16B:
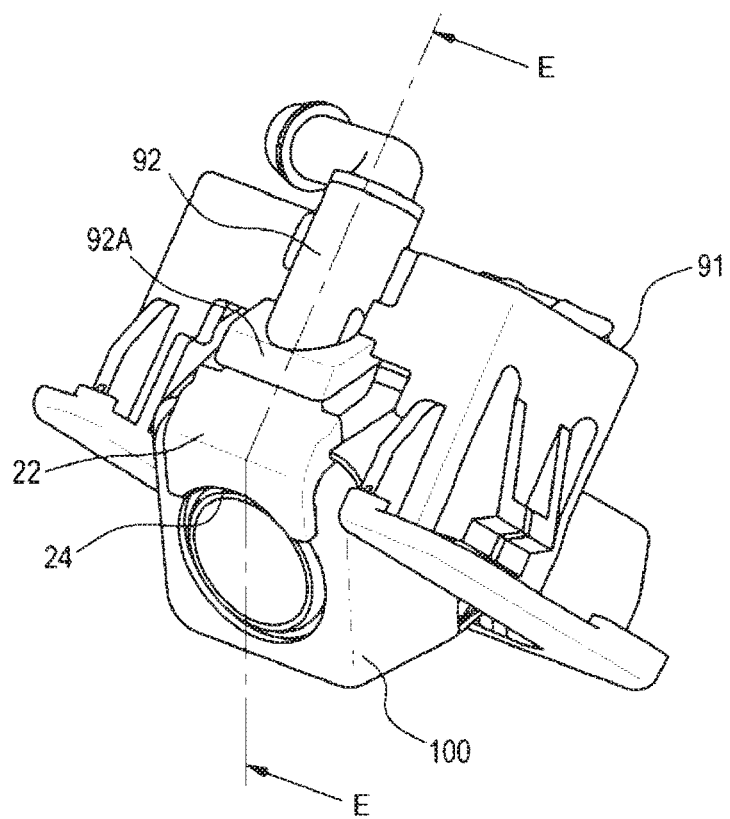

FIG. 16A shows a state in which the respective members are not assembled, and FIG. 16B shows a state in which the respective members are assembled. FIG. 17 shows a sectional view taken along the arrow E-E in FIG. 16B.

A bypass passage 73B of the third modified example is different from the bypass passage 73 (see FIG. 12) formed to penetrate the lower wall 72 of the nozzle 122 in that the bypass passage 73B is formed by assembling the in-vehicle camera 100 to which the nozzle unit 2 is attached to a camera bracket 91. Meanwhile, since the parts denoted by the same reference numerals as those in the above-described embodiment have the same functions and operations, a duplicated description thereof will be omitted.

As shown in FIGS. 16A and 16B, the camera bracket 91 is provided with a pipe line (an example of the connecting portion) 92 and an opening portion 93. The pipeline 92 is a pipe that communicates the nozzle 22 and the joint member 3 with each other. The pipeline 92 has a nozzle-side connecting portion 92A at an end portion on the side to which the nozzle 22 is connected and has a joint-side connecting portion 92B at an end portion on the side to which the joint member 3 is connected. A connecting passage is formed in the pipeline 92. The nozzle-side connecting portion 92A is provided with a nozzle connection port 94, and the joint-side connecting portion 92B is provided with a joint connection port 95.

The opening portion 93 is a portion in which the in-vehicle camera 100 is housed. The in-vehicle camera 100 has a connector portion 103 provided with a power supply terminal, a signal terminal and the like.

Each component having such a configuration is assembled in the following procedure. First, the nozzle 22 is adhered to an upper surface 10A of the in-vehicle camera 100 by the adhesive member (e.g., double-sided tape) 25. In this case, the ejecting port 24 of the nozzle 22 is adjusted and adhered so as to face, for example, the center point of the lens 101 of the in-vehicle camera 100. Subsequently, the connector portion 103 of the in-vehicle camera 100 is inserted into the opening portion 93 of the camera bracket 91. In the inserted in-vehicle camera 100, the portion on the side of the lens 101 is rotated in a direction of the upper surface 100A of the in-vehicle camera 100 about the end portion on the side of the connector portion 103, and the nozzle 22 adhered to the upper surface 100A is brought close to the pipeline 92 of the camera bracket 91. As the in-vehicle camera 100 is further rotated, a part of the nozzle-side connecting portion 92A of the pipeline 92 is inserted into the inlet port 23 of the nozzle 22. In this state, for example, an engaging portion of the camera bracket 91 is engaged with an engaging portion of the in-vehicle camera 100, so that the assembly is completed.

Figure 17:
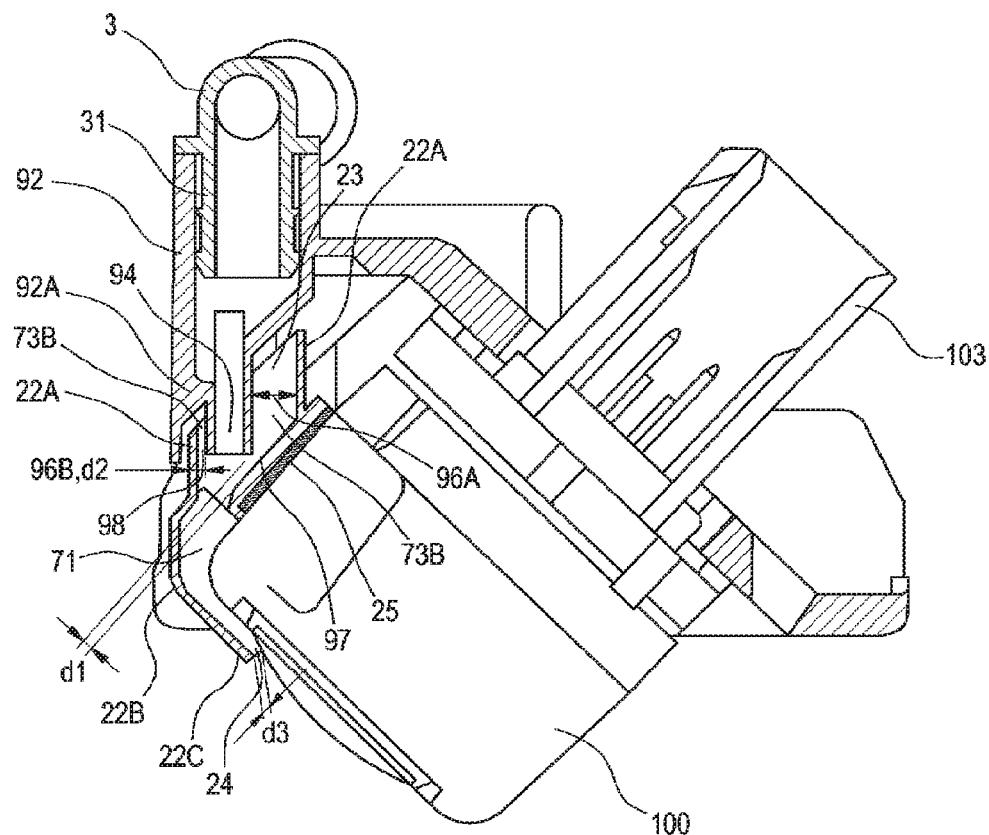
FIG. 17 is a longitudinal sectional view taken along the line E-E in FIG. 16.

As shown in FIG. 17, a sectional area of the nozzle connection port 94 of the nozzle-side connecting portion 92A is smaller than that of the inlet port 23 of the connecting portion 22A of the nozzle 22. Therefore, gaps 96A, 96B are formed between an outer peripheral surface of the nozzle-side connecting portion 92A and an inner peripheral surface of the connecting portion 22A. These gaps serve as the bypass passage 73B. The bypass passage 73B communicates with the communication passage 71 in the nozzle 22 through an opening 97 or an opening 98. A sectional area of the opening 97 and a sectional area of the opening 98 are smaller than that of the ejecting port 24 of the nozzle 22, respectively. A distance d1 of the opening 97 and a distance d2 of the opening 98 are smaller than a distance d3 of the ejecting port 24 of the nozzle 22, respectively. Meanwhile, the function and operation of the bypass passage 73B are similar to those of the bypass passage 73 (see FIG. 12) described in the second embodiment.

According to this configuration, it is possible to simply configure the bypass passage 73B by using the pipeline 92 provided in the camera bracket 91. Further, when assembling the camera bracket 91 to the in-vehicle camera 100 to which the nozzle 22 is adhered, the nozzle-side connecting portion 92A of the pipeline 92 and the nozzle connection port 94 of the nozzle 22, which differ from each other in the maximum outer diameter and the sectional area, are inserted and assembled together. Therefore, when assembling the in-vehicle camera 100 to the camera bracket 91, the nozzle-side connecting portion 92A and the nozzle connection port 94 can be assembled without bringing them into contact with each other. Thus, the nozzle 22 does not obstruct the assembly, and the position of the nozzle 22 to the lens 101 can be appropriately set. In addition, the same effects as the second modified example can be obtained.

Figure 18:
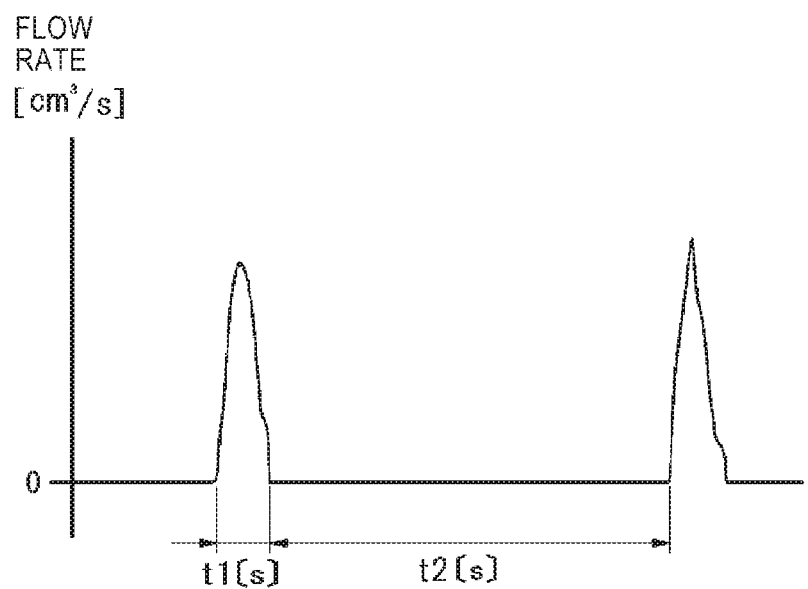
FIG. 18 is a graph showing a temporal change in the flow rate of high-pressure air injected from the nozzle.

Further, the high-pressure air generation unit 5 described with reference to FIG. 4 may be operated as follows. Specifically, in FIG. 18, the time during which the piston 52 in the high-pressure air generation unit 5 moves from the top dead center (a state in which an end portion 52A is located at an imaginary line L of the first space 60a) to the bottom dead center (a state shown in FIG. 4) is defined as a force accumulation time t2(s), and the time during which the piston 52 moves from the bottom dead center to the top dead center is defined as an exhaust time (feeding time) t1. At this time, as shown in FIG. 18, it is preferable that the force accumulation time t2 is ten times or more the feeding time t1. In this way, by slowly moving the piston 52 from the top dead center to the bottom dead center while instantaneously moving the piston 52 from the bottom dead canter to the top dead center, that is, by instantaneously exhausting the air within the feeding time t1 while securing the force accumulation time t2 which is sufficiently longer than the feeding time t1, it is possible to reliably move water droplets adhering to the lens 101 even in the high-pressure air generation unit 5 where an urging force of the urging spring 58 is small.

Further, in the above configuration, the speed of the piston 52 in the feeding direction which is a moving direction for feeding out air is set to be considerably faster than the speed thereof in the force accumulation direction which is opposite to the feeding direction and is a moving direction when air is sucked. In this way, the moving speed of air in the communication passage 71 is also faster at the time of exhaust than at the time of intake. With this configuration, the bypass passage 73 can sufficiently exert its function as a bypass even when a sectional area of the opening 74 of the bypass passage 73 is smaller than that of the pipeline 71d (ejecting port 24). That is, even when the ejecting port 24 is clogged with the dust or the like, the air intake can be performed via the bypass passage 73 for a relatively long force accumulation time. Further, at the time of injection, the high-pressure air can be injected from the ejecting port 24 while suppressing the outflow of the high-pressure air from the bypass passage 73 to a small extent, thereby securing the foreign matter removal performance.

Third Embodiment

Figure 19:
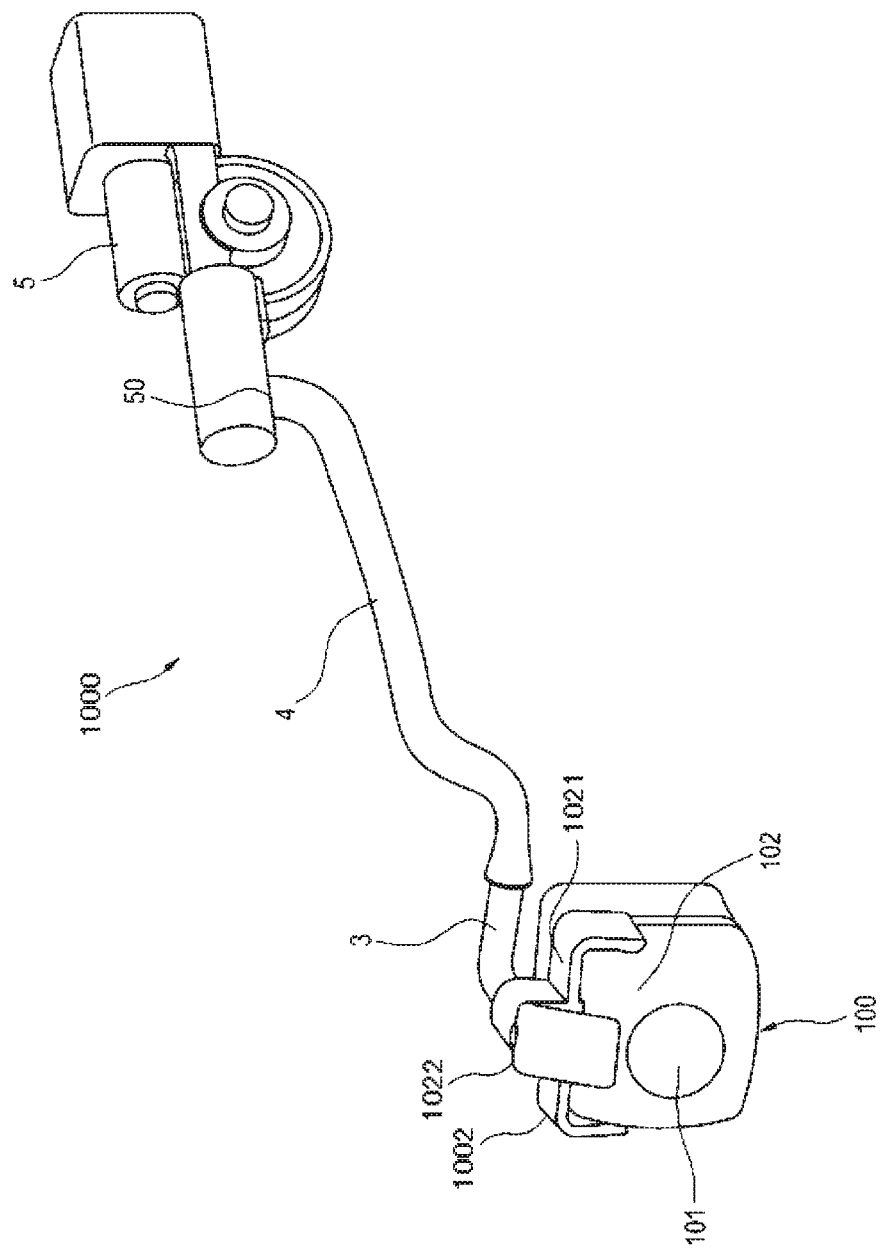
FIG. 19 is a perspective view of a foreign matter removal device according to a third embodiment of the present invention.

FIG. 19 is a perspective view of a foreign matter removal device according to a third embodiment of the present invention.

As shown in FIG. 19, a foreign matter removal device 1000 includes a nozzle unit 1002, the joint member 3, the hose 4, and the high-pressure air generation unit (an example of the generation unit) 5. Meanwhile, since a basic configuration of the nozzle unit 1002 is similar to that of the nozzle unit 2 of the first embodiment, a duplicated description thereof ill be omitted. In addition since the parts denoted by the same reference numerals as those in the above-described embodiment have the same functions and operations, a duplicated description thereof will be omitted.

Figure 20:
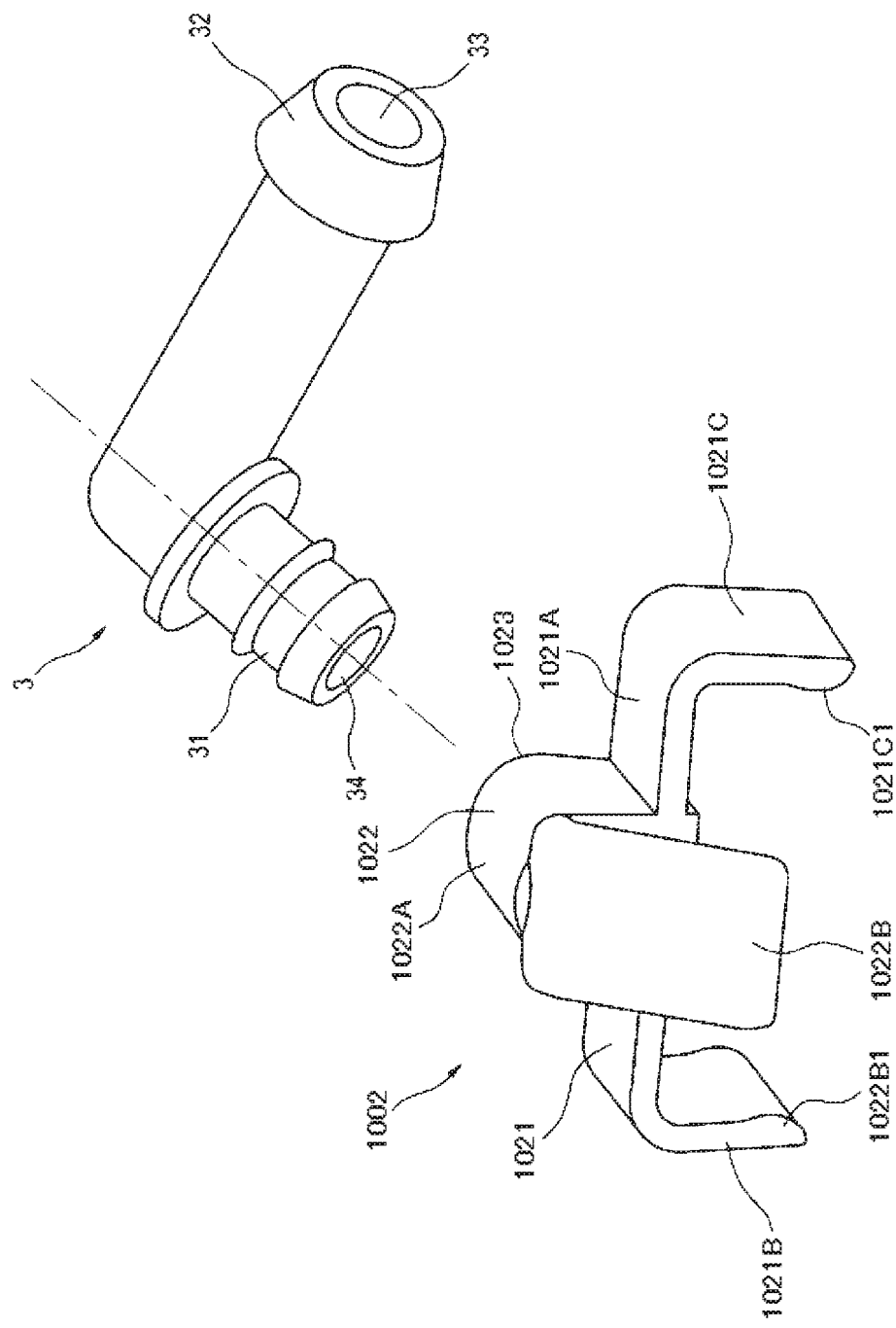
FIG. 20 is an exploded perspective view showing a nozzle unit and joint member according to the third embodiment.

As shown in FIG. 20, an attachment part 1021 of the nozzle unit 1002 has a substantially rectangular top plate 1021A and two side plates 1021B, 1021C. The side plate 1021B is continuous to one end portion of the top plate 1021A and is provided so as to protrude on the lower surface side of the top plate 1021A. The side plate 1021C is positioned on the side opposite to the side plate 1021B. The side plate 1021C is continuous to the other end portion of the top plate 1021A and is provided so as to protrude on the lower surface side of the top plate 1021A. As the resin constituting the attachment part 1021, a material excellent in elasticity is used.

A nozzle 1022 of the nozzle unit 1002 is disposed at the center on the top plate 1021A of the attachment part 1021. The nozzle 1022 has a connecting portion 1022A and a top wall 1022B (an example of the first wall portion). The connecting portion 1022A is a portion to which the joint member 3 is connected. The connecting portion 1022A is provided with an inlet port 1023 into which high-pressure air flows. The top wall 1022B is a portion from which high-pressure air is ejected. The top wall 1022B protrudes obliquely downward from the upper portion of the connecting portion 1022A. The high-pressure air flowing into the inlet port 1023 passes through the connecting portion 1022A and is ejected toward the lens 101 along the top wall 1022B.

Figure 21:
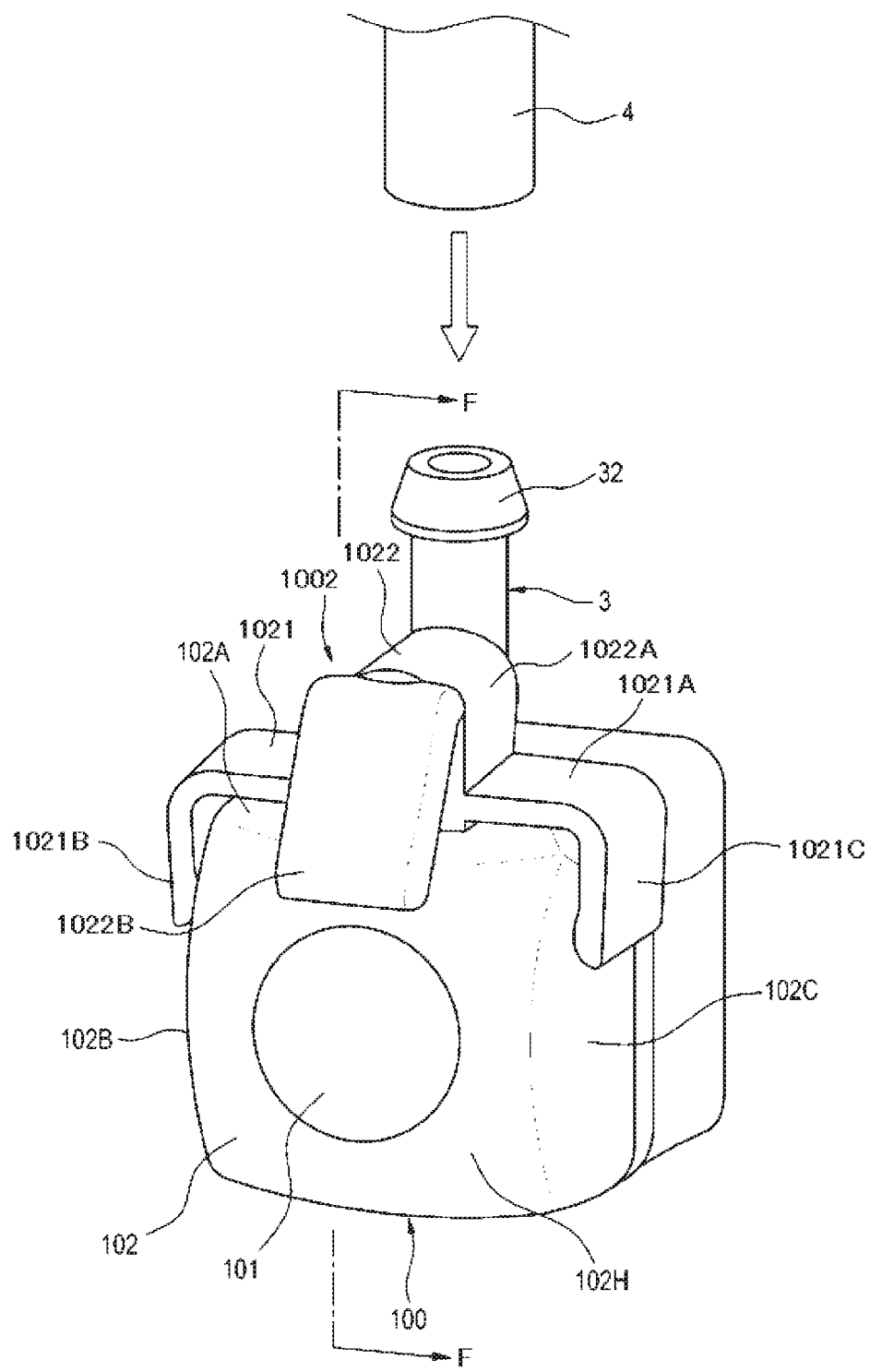
FIG. 21 is a perspective view showing the nozzle unit attached to an in-vehicle camera in FIG. 19.

As shown in FIG. 21, the housing 102 of the in-vehicle camera 100 is formed in a cube shape, for example. The housing 102 is provided with the upper surface (an example of the first surface) 102A, the side surfaces 102B. 102C continuous with both end portions of the upper surface 102A, and the front surface (an example of the camera front surface) 102H continuous with one end of each of the upper surface 102A, the right surface 102B and the left surface 102C. The front surface 102H is a plan view area when viewing the housing 102 as a single body from the front.

In a state in which the attachment part 1021 of the nozzle unit 1002 is attached to the housing 102 of the in-vehicle camera 100, the top wall 1022B of the nozzle 1022 is disposed at a position facing the front surface 102H of the housing 102. In the present embodiment, an ejecting port of the nozzle 1022 is formed only by the top wall 1022B, and a wall (bottom wall) facing the top wall 1022B and side walls extending from both ends of the top wall 1022B are not formed.

Figure 22:
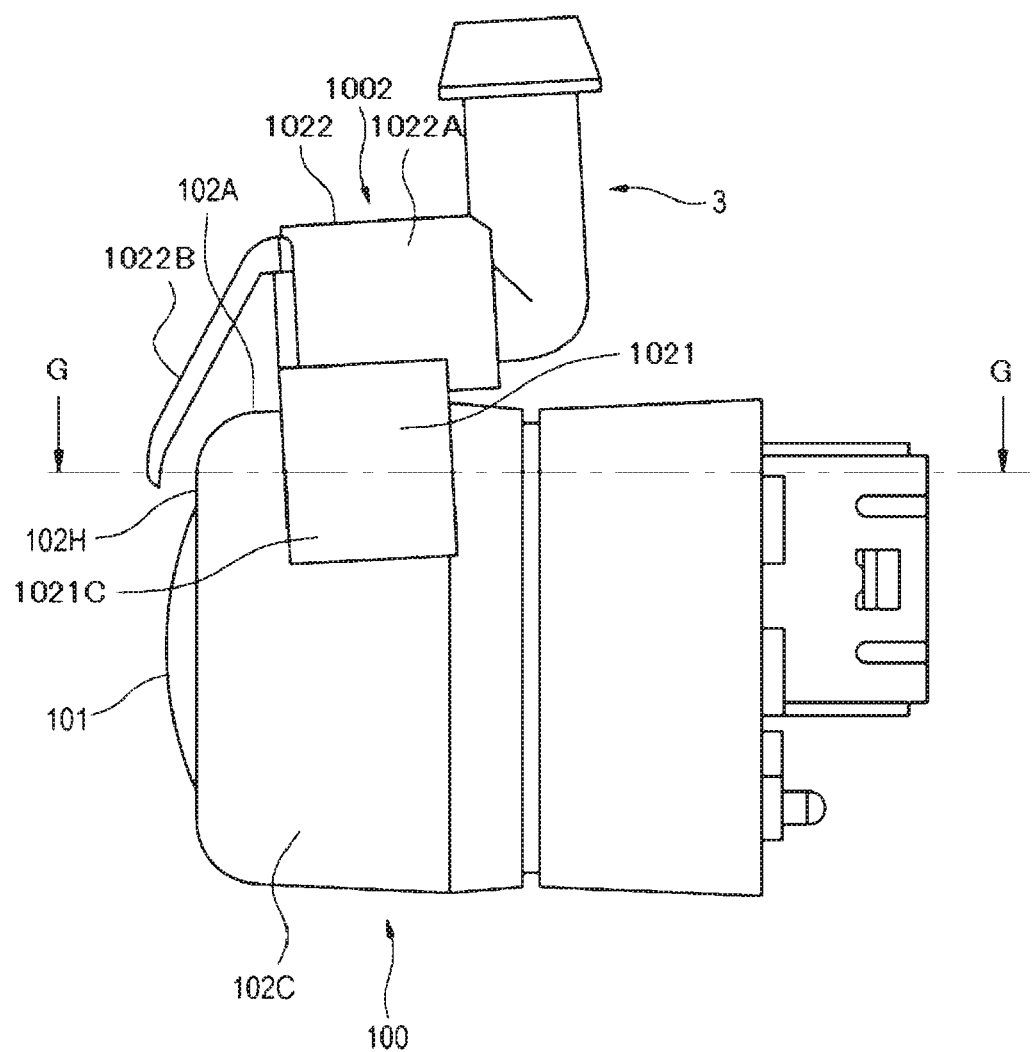
FIG. 22 is a side view showing a mounting state of the nozzle unit to the in-vehicle camera.

As shown in FIG. 22, the nozzle 1022 is positioned so that the top wall 1022B is disposed toward the lens 10 so as to extend along a shoulder portion between the upper surface 102A and the front surface 102H from the upper surface 102A of the housing 102, and a tip end of the top wall 1022B faces the lens 101.

Figure 23A:
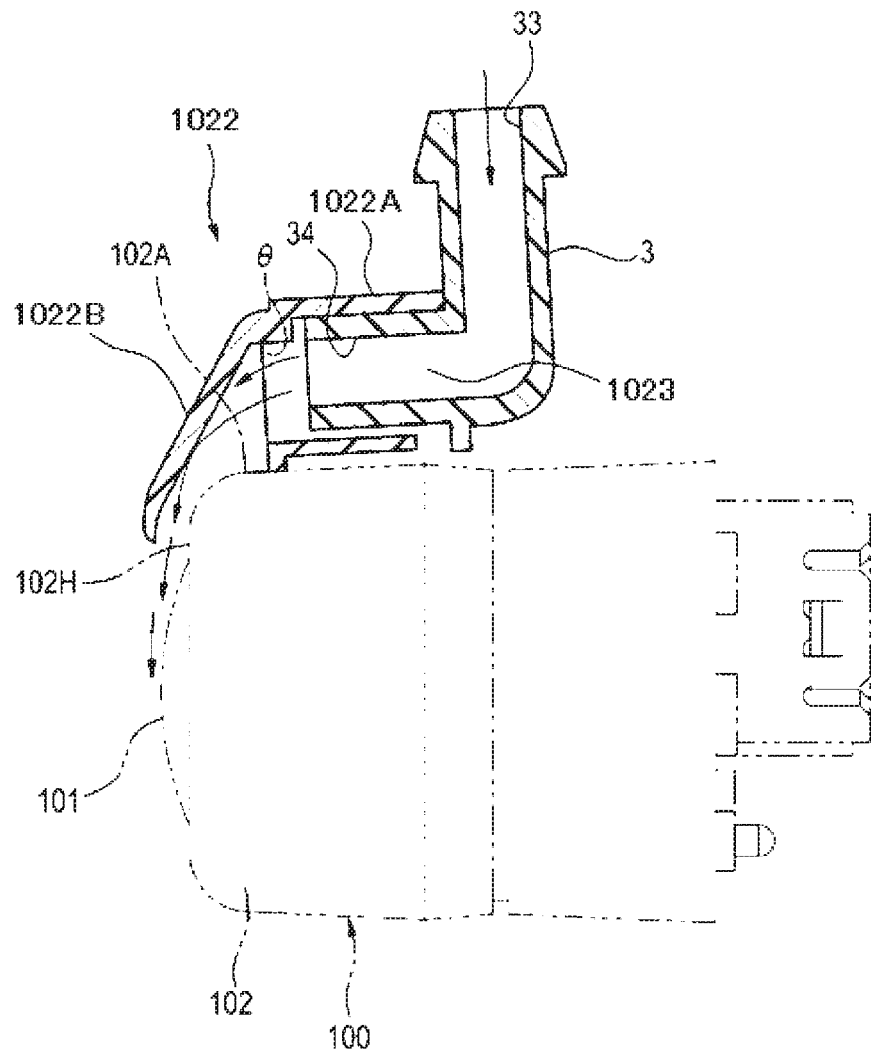
FIG. 23A is a longitudinal sectional view taken along the line F-F in FIG. 21.

As shown in FIG. 23A, the high-pressure air flowing into the inlet port 33 of the joint member 3 via the hose 4 flows into the inlet port 1023 of the connecting portion 1022A of the nozzle 1022. The high-pressure air flowing into the inlet port 1023 of the connecting portion 1022A passes between the top wall 1022B and the upper surface 102A of the housing 102 and is ejected from between the top wall 1022B and the front surface 102H of the housing 102. In this way, a blow-off port of high-pressure air is formed between the top wall 1022B and the housing 102. At this time, preferably, the shape of the nozzle 1022 is configured such that the high-pressure air flowing into the nozzle 1022 from the high-pressure air generation unit 5 is injected toward the lens 101 while hitting against the top wall 1022B. Specifically, the nozzle 1022 is formed so that an angle θ formed between the connecting portion 1022A and the top wall 1022B becomes an obtuse angle, preferably 110° or more but 160° or less.

Figure 23B:
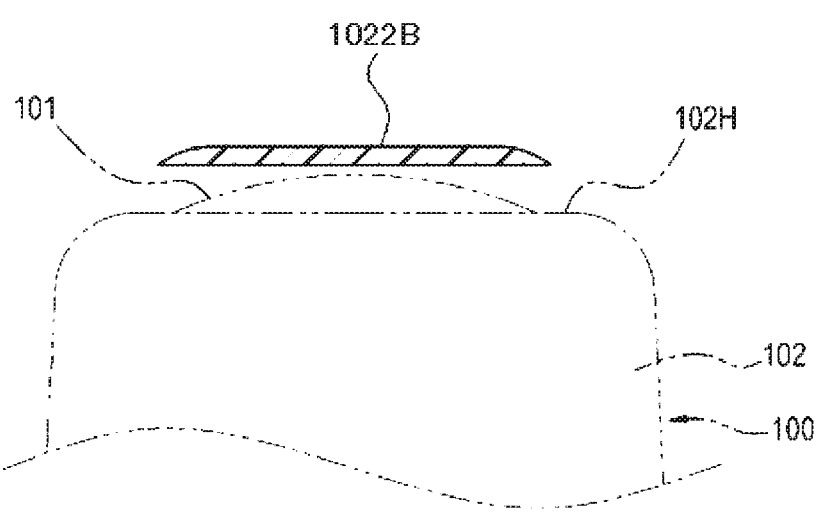
FIG. 23B is a transverse sectional view taken along the line G-G in FIG. 22.

Meanwhile, as shown in FIG. 23B, in a top view in a state where the nozzle unit 1002 is attached to the in-vehicle camera 100, the top wall 1022B has a shape extending substantially in parallel with the front surface 102H of the housing 102 of the in-vehicle camera 100, and a side wall or the like extending from the top wall 1022B toward the front surface 102H of the housing 102 is not provided.

Next, an operation of the foreign matter removal device 1000 according to the present embodiment will be described with reference to FIG. 19 or the like again.

When the driving of the motor 55 in the high-pressure air generation unit 5 is started, first, air (outside air) for generating high-pressure air is sucked. The air is sucked into the high-pressure air generation unit 5 from the ejecting port 1024 of the nozzle 1022. The sucked air is fed out, as high-pressure air, from the discharge port 50 of the high-pressure air generation unit 5 to the hose 4 by piston motion due to an urging force of the urging spring 58. The high-pressure air is fed from the hose 4 to the nozzle 1022 of the nozzle unit 1002 through the joint member 3.

The high-pressure air is introduced into the inlet port 1023 (see FIG. 23A) of the nozzle 1022 and is introduced between the top wall 1022B and the front surface 102H of the housing 102. The high-pressure air introduced between the top wall 1022B and the front surface 102H of the housing 102 flows along a shoulder portion of the front surface 102H of the housing 102 and is blown toward the lens 101 of the in-vehicle camera 100. In this way, foreign matters adhering to the lens 101 are blown away, so that the dirt of the lens 101 is eliminated.

By the way, when a blow-off port of a nozzle is arranged at a position facing an upper surface of a housing of a camera as in the conventional foreign matter removal device, it is difficult to effectively blow high-pressure air on a lens. Further, when it is attempted to form a tip end of a nozzle with a wall portion covering the entire circumferential surface of an ejecting port of high-pressure air, it is necessary to make a space for attaching the foreign matter removal device to a vehicle relatively large.

On the contrary, according to the foreign matter removal device 1000 of the present embodiment, the tip end of the nozzle 1022 is formed by the top wall 1022B facing the front surface 102H of the in-vehicle camera 100. Therefore, the high-pressure air sent from the high-pressure air generation unit 5 flows between the top wall 1022B and the front surface 102H of the camera housing 102 and is effectively blown on the lens 101, so that the performance of removing foreign matters can be maintained. Further, the tip end of the nozzle 1022 is formed only by the top wall 1022B, and the ejecting portion of the nozzle is not formed by the wall portion covering the entire circumferential surface of the ejecting port of high-pressure air unlike the prior art. Therefore, the configuration is simple, the thickness of the ejecting port of the nozzle 1022 can be reduced to achieve space saving, and mountability to the vehicle is extremely excellent.

Further, according to the foreign matter removal device 1000, the shape of the nozzle 1022 is configured such that the high-pressure air flowing into the nozzle 1022 from the high-pressure air generation unit 5 is injected toward the lens 101 while hitting against the top wall 1022B. In this way, by causing the high-pressure air to be fed out while hitting against the top wall 1022B, the high-pressure air can be rectified, so that the high-pressure air of an appropriate air volume can be sent to an appropriation location on the surface of the lens 101.

Fourth Modified Example

Next, a modified example (fourth modified example) of the nozzle unit 1002 in the third embodiment described above will be described with reference to FIGS. 24 to 26.

Figure 24:
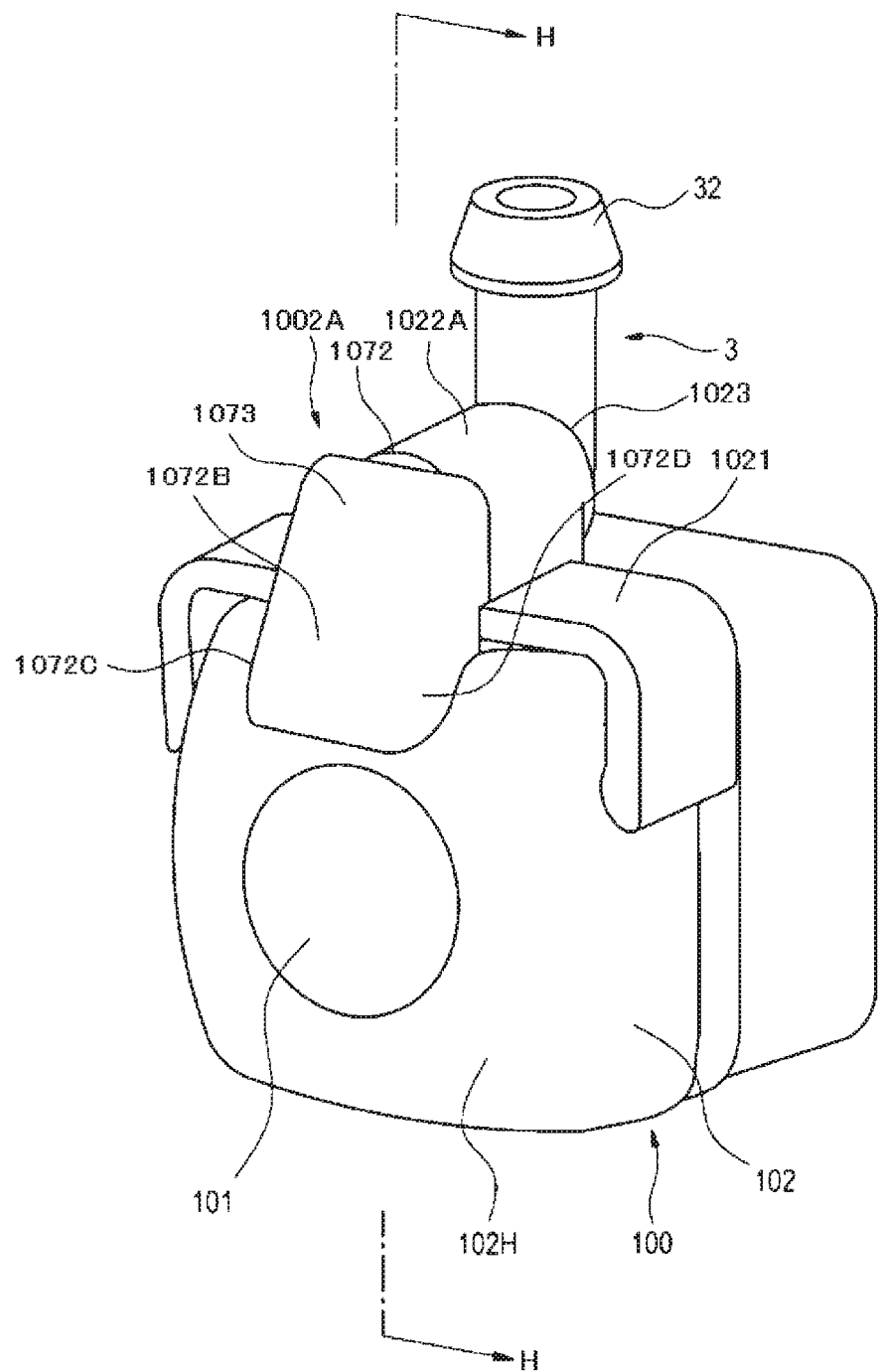
FIG. 24 is a perspective view for explaining a modified example (fourth modified example) of the nozzle included in the nozzle unit.
Figure 25A:
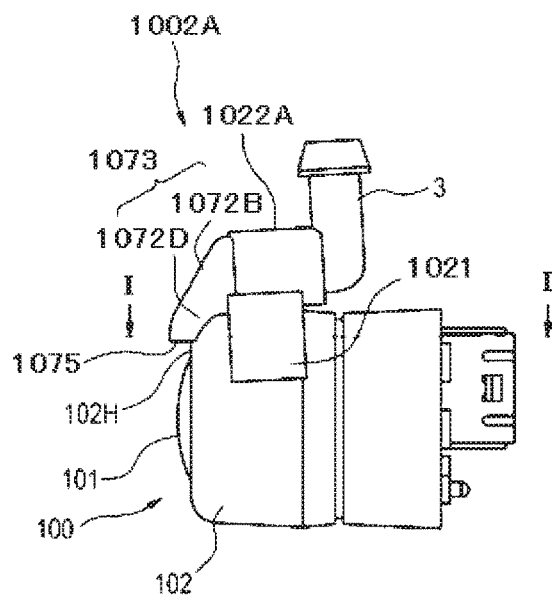
FIG. 25A is a side view showing a state in which the nozzle unit shown in FIG. 24 is attached to the in-vehicle camera.
Figure 25B:
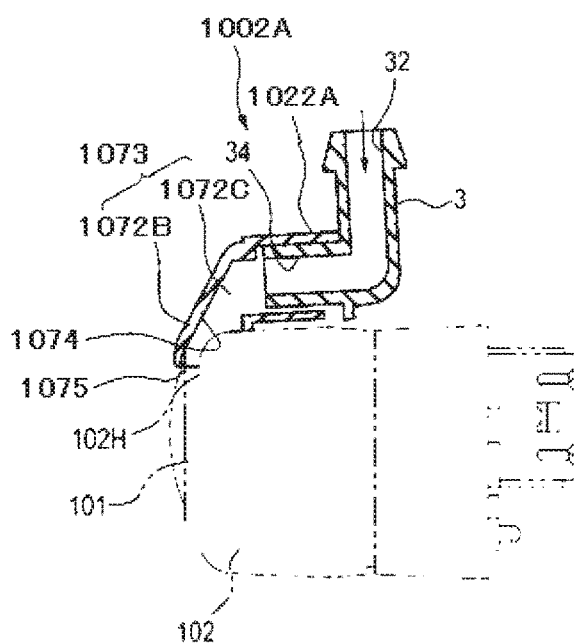
FIG. 25B is a longitudinal sectional view taken along the arrow H-H in FIG. 24.
Figure 25C:
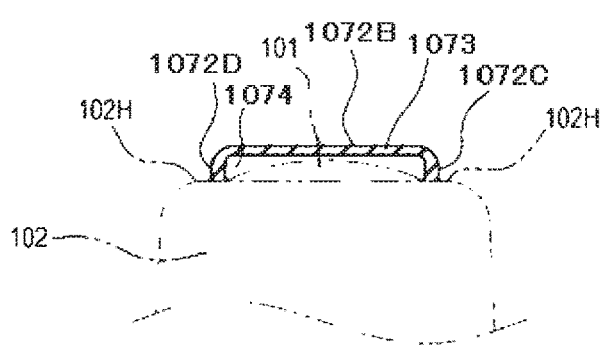
FIG. 25C is a transverse sectional view taken along the arrow I-I in FIG. 25C.

FIG. 24 shows the nozzle unit 1002A attached to the in-vehicle camera 100. FIG. 25A is a side view of a state in which the nozzle unit 1002A is attached to the in-vehicle camera 100, FIG. 25B is a longitudinal sectional view taken along the arrow H-H in FIG. 24, and FIG. 25C is a transverse sectional view taken along the arrow I-I in FIG. 25A. A nozzle 1072 of the fourth modified example is different from the nozzle 1022 (see FIGS. 21, 22, etc.) in a structure of an ejecting portion 1073. Meanwhile, since the parts denoted by the same reference numerals as those in the above-described embodiment have the same functions and operations, a duplicated description thereof will be omitted.

The nozzle unit 1002A includes the attachment part 1021 and the nozzle 1072. The nozzle 1072 is provided with the connecting portion 1022A and the ejecting portion 1073. The ejecting portion 1073 is a portion from which high-pressure air is ejected. The high-pressure air flowing into the inlet port 1023 via the joint member 3 passes through the connecting portion 1022A and is ejected from the ejecting portion 1073.

As shown in FIGS. 24 and 25, the ejecting portion 1073 has a top wall 1072B facing the front surface 102H of the housing 102, and two side walls 1072C, 1072D (an example of the second wall portion). The side wall 1072C is continuous to one end portion of the top wall 1072B and is provided so as to protrude in a direction away from the top wall 1072B. The side wall 1072D is positioned on the side opposite to the side wall 1072C. The side wall 1072D is continuous to the other end portion of the top wall 1072B and is provided so as to protrude in a direction away from the top wall 1072B. In this way, the ejecting portion 1073 of the nozzle 1072 is constituted by the top wall 1072B and the side walls 1072C, 1072D, and a wall (bottom wall) facing the top wall 1072B is not formed.

In a state in which the attachment part 1021 is attached to the housing 102 of the in-vehicle camera 100, the nozzle 1072 is configured such that the side walls 1072C, 1072D of the ejecting portion 1073 come into contact with the front surface 102H of the housing 102 (see FIG. 25C). As the side walls 1072C, 1072D come into contact with the front surface 102H, the nozzle 1072 is positioned with respect to the front surface 102H of the housing 102. Further, in the state in which the attachment part 1021 is attached to the housing 102, a communication passage 1074 surrounded by the top wall 1072B, the side walls 1072C, 1072D and the front surface 102H of the housing 102 is formed in the ejecting portion 1073 (see FIGS. 25B and 25C). The high-pressure air is ejected from an ejecting port 1075 through the communication passage 1074.

According to this configuration, the communication passage 1074 covering the entire circumferential surface of the blow-off port of the high-pressure air is formed by the top wall 1072B, the side walls 1072C, 1072D and the front surface 102H of the camera housing 102. In this way, the high-pressure air injected from the nozzle 1072 can be more effectively directed to the lens 101. Further, the attachment part 1021 is fixed to the housing 102 of the in-vehicle camera 100, and the side walls 1072C, 1072D of the nozzle 1072 are positioned by being brought into contact with the front surface 102H of the housing 102. That is, the tip end of the nozzle 1072 can be accurately positioned with respect to the lens 101 of the in-vehicle camera 100 not only in the left and right direction but also in the front and rear direction of the in-vehicle camera 100. Further, since the ejecting portion 1073 is configured by the top wall 1072B and the side walls 1072C, 1072D, and a bottom wall facing the top wall 1072B is not provided, the thickness of the nozzle 1072 can be reduced to achieve space saving.

Figure 26:
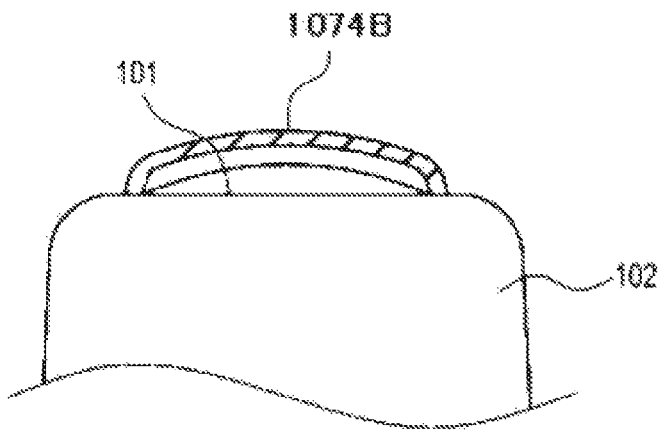
FIG. 26 is a transverse sectional view showing another example of the nozzle included in the nozzle unit according to the fourth modified example.

Meanwhile, in the fourth modified example, the side walls 1072C, 1072D are in contact with the front surface 102H of the housing 102. However, the side walls 1072C, 1072D may not be in contact with the front surface 102H. Also in this case, the high-pressure air can be effectively directed to the lens 101 by the top wall and the side walls. Further, as shown in FIG. 26, a top wall 1074B may be formed to have an arcuate cross-section matching the arcuate shape of the lens 101. In this way, the high-pressure air can be uniformly directed to the entire surface of the lens 101.

Fifth Modified Example

Next, another modified example (fifth modified example) of the nozzle unit in the third embodiment will be described with reference to FIG. 27.

Figure 27:
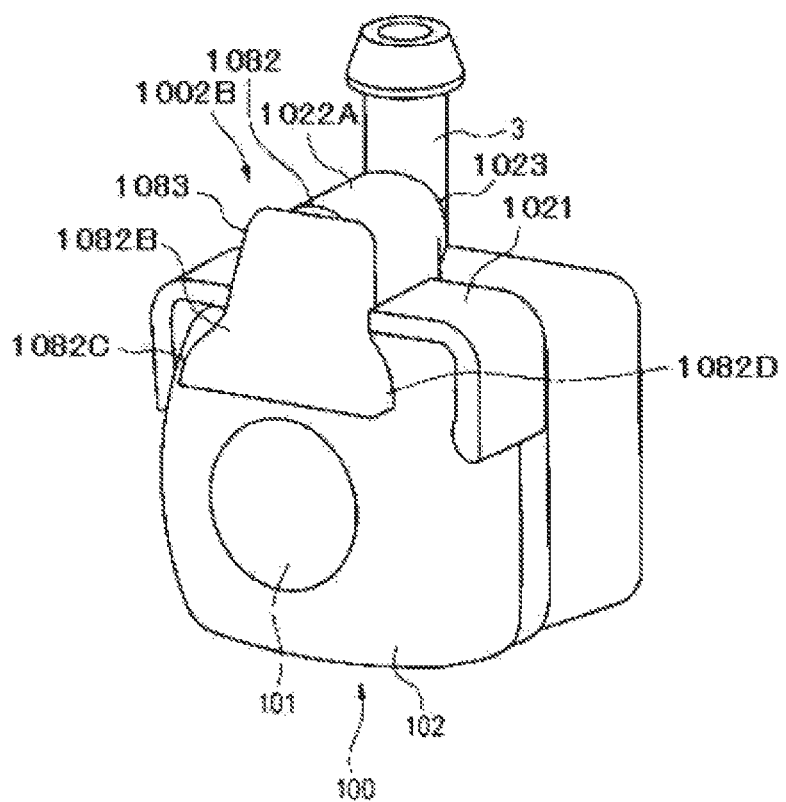
FIG. 27 is a perspective view for explaining another modified example (fifth modified example) of the nozzle included in the nozzle unit.

As shown in FIG. 27, a nozzle unit 1002B has the attachment part 1021 and a nozzle 1082. The nozzle 1082 is provided with the connecting portion 1022A and an ejecting portion 1083. The ejecting portion 1083 has a top wall 1082B facing the front surface 102H of the housing 102, and side walls 1082C, 1082D extending toward the lens 101 from both ends of the top wall 1082B. The top wall 1082B is formed in a fan-like shape enlarged from the connecting portion 1022A toward the front surface of the lens 101 located on the lower side. The high-pressure air flowing into the inlet port 1023 via the joint member 3 passes through the connecting portion 1022A and is ejected from the ejecting portion 1083. According to the fifth modified example, since the top wall 1082B is formed in a fan-like shape, the high-pressure air can be substantially uniformly blown toward the entire outer surface of the lens 101.

Sixth Modified Example

Next, yet another modified example (sixth modified example) of the nozzle unit in the third embodiment will be described with reference to FIGS. 28A and 28B.

Figure 28A:
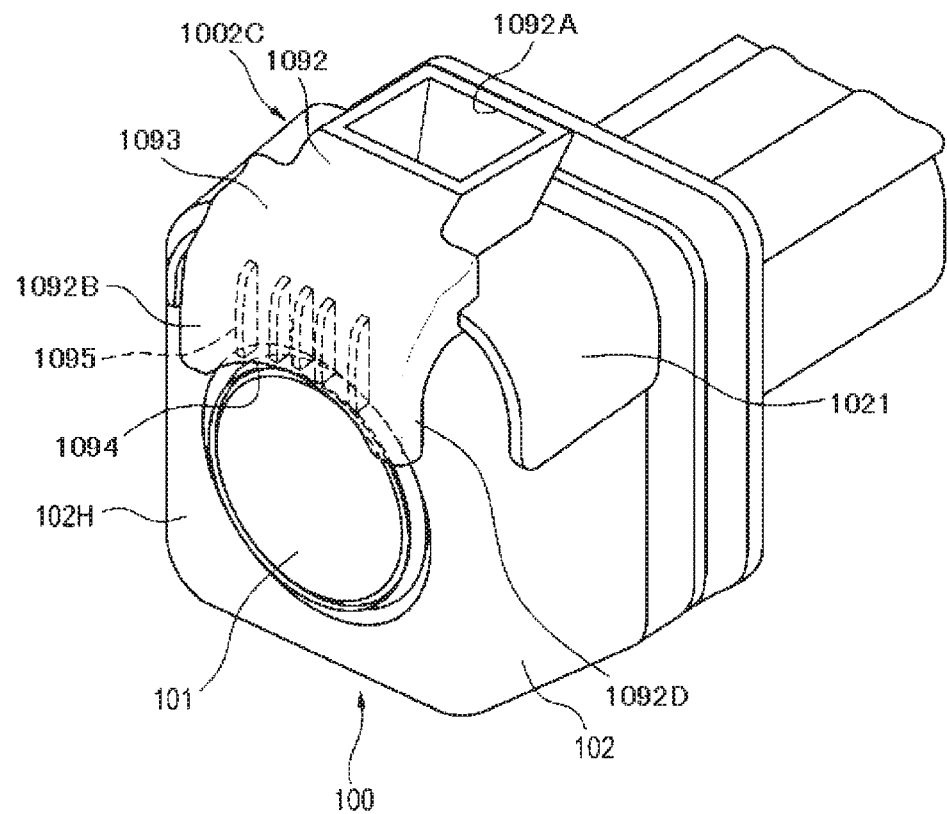
FIG. 28A is a perspective view for explaining yet another modified example (sixth modified example) of the nozzle included in the nozzle unit.
Figure 28B:
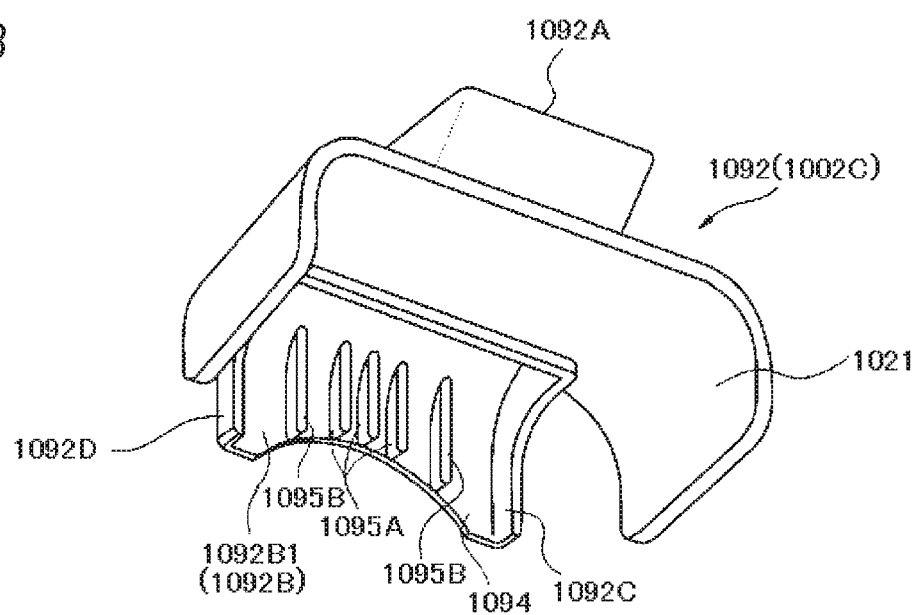
FIG. 28B is a rear perspective view of the nozzle unit in FIG. 28A.

As shown in FIGS. 28A and 28B, a nozzle unit 1002C has the attachment part 1021 and a nozzle 1092. The nozzle 1092 is provided with an opening portion 1092A and an ejecting portion 1093. The opening portion 1092A is an opening into which a hose or a joint member (not shown) is inserted and through which high-pressure air flows. Here, the hose or the joint member is connected to the high-pressure air generation unit 5 and feeds out high-pressure air. The ejecting portion 1093 is a portion from which high-pressure air is ejected. The high-pressure air introduced through the opening portion 1092A is ejected from an ejecting port 1094 of the ejecting portion 1093.

The ejecting portion 1093 has a top wall 1092B facing the front surface 102H of the housing 102, and two side walls 1092C, 1092D. A surface 1092B1 (see FIG. 28B) of the top wall 1092B facing the front surface 102H of the housing 102 is provided with a plurality of elongated projections 1095. The projections 1095 are members for rectifying the high-pressure air and injecting it to the lens 101. As shown in FIG. 28B, the plurality of projections 1095 are arranged such that an arrangement pitch between the projections 1095A at the center portion is slightly narrower than an arrangement pitch between the projections 1095B on both sides and the projections 1095A on the inside thereof. In this way, the flow velocity of the high-pressure air flowing between the projections 1095A at the center portion is higher than the flow velocity of the high-pressure air flowing between the projections 1095B at the center portion and the projections 1095B on both sides. Therefore, the high-pressure air can be injected so that foreign matters such as water droplets can flow from the center to the outside of the lens 101.

In a state in which the attachment part 1021 is attached to the housing 102 of the in-vehicle camera 100, the nozzle 1092 is disposed such that the side walls 1092C, 1092D of the ejecting portion 1093 are in contact with the front surface 102H of the housing 102. In this way, the communication passage surrounded by the top wall 1092B, the side walls 1092C, 1092D and the front surface 102H of the housing 102 is formed. The high-pressure air introduced through the opening portion 1092A is ejected from the ejecting port 1094 toward the lens 101 while being rectified by the projections 1095 formed in the communication passage. In this way, according to the configuration of the sixth modified example, the injection direction, amount, pressure, etc. of the high-pressure air in the ejecting portion 1093 are controlled by the projections 1095, so that the high-pressure air can be more efficiently blown onto the lens 101.

In each of the above embodiments, an example of the foreign matter removal devices 1, 1000 in which the high-pressure air is generated by the high-pressure air generation unit 5 and foreign matters on the lens are removed by injecting the high-pressure air from the nozzle 22 has been described. However, the nozzle units according to the above embodiments and the modified examples thereof may be applied as a foreign matter removal device including a reservoir for storing cleaning liquid and a nozzle for injecting the cleaning liquid toward the lens of the camera.

Further, in the above embodiments, the joint member 3 is provided as a member for joining the nozzle 22 of the nozzle unit 2 and the hose 4. However, in the case where there is no need to change the posture of the hose 4 with respect to the nozzle 22, the hose 4 may be directly attached to the nozzle 22 without providing the joint member 3.

Meanwhile, the present invention is not limited to the above-described embodiments, but can be appropriately deformed or improved. In addition, the materials, shapes, dimensions, numerical values, modes, quantities, and locations and the like of the respective components in the above-described embodiments are arbitrary and not limited as long as they can achieve the present invention.

For example, in the above examples, the application to the in-vehicle camera has been described. However, the object to which the present invention is applied is not limited as long as it is a camera used outdoors. For example, a camera mounted so as to be exposed to the outside of an airplane, a railroad, a ship, a robot, an outdoor installation object, a building and the like may be included.

Further, in the above-described examples, the application to the camera (not limited to visible light) has been described. However, the sensor to which the present invention is applied is not limited to this. The present invention may be applied to sensors attachable to vehicles, such as LIDAE (laser radar), millimeter wave radars, and ultrasonic sensors.

Further, the target portion from which the foreign matter removal device removes foreign matters is not limited to the lens of the camera. For example, the present invention can be applied to a foreign matter removal device for removing foreign matters adhering on "partition wall" which is defined as a concept including an optical lens of a sensor element, a cover for covering a front surface of an optical lens, a cover for covering a vehicle mounted component such as a lamp having a part serving as a communication window of a sensor, a mirror, a bumper, a grill and a door knob, and a vehicle window when a sensor is mounted in a vehicle compartment Meanwhile, this partition wall is not limited to a transparent member (translucency), but may not be transparent in an ultrasonic sensor, a millimeter wave radar or the like.

The present application is based on Japanese Patent Application (Patent Application No. 2015-131785) filed on Jun. 30, 2015, Japanese Patent Application (Patent Application No. 2015-131786) filed on Jun. 30, 2015, and Japanese Patent Application (Patent Application No. 2015-131788) filed on Jun. 30, 2015, the contents of which are incorporated herein by reference.

The invention claimed is:

1. A foreign matter removal device configured to remove foreign matters on a lens of a camera attached so that the lens of the camera is exposed toward an outside of a panel member, the foreign matter removal device comprising:
a generation unit configured to generate high-pressure air; and
a nozzle unit having:
a nozzle configured to inject the high-pressure air toward the lens; and
an attachment part formed integrally with the nozzle and attachable to a housing of the camera, wherein
a tip end of the nozzle is positioned with respect to the lens in a state where the attachment part is attached to the housing;
wherein the housing has
a first surface;
a second surface continuous with one end of the first surface; and
a third surface located on a side opposite to the second surface and continuous with the other end of the first surface, and
in a state of being attached to the housing, the attachment part has:
an opposing surface facing the first surface;
a first contact portion elastically deformable in a direction away from the second surface and in contact with the second surface; and
a second contact portion elastically deformable in a direction away from the third surface and in contact with the third surface.

2. The foreign matter removal device according to claim 1, wherein
the camera is an in-vehicle camera, and
the panel member is a body panel of a vehicle.

3. The foreign matter removal device according to claim 1, wherein
the first surface of the housing and the opposing surface of the attachment part are adhered to each other in a planar manner via an adhesive member.

4. The foreign matter removal device according to claim 1, wherein
the housing and the attachment part are engageable with each other.

5. The foreign matter removal device according to claim 1, wherein
the housing has a camera front surface on which a lens hole for exposing the lens is formed, and
the nozzle has a positioning portion which is in contact with the camera front surface and positioned with respect to the camera front surface in a state where the attachment part is attached to the housing.

6. The foreign matter removal device according to claim 1, wherein
the generation unit has a discharge port configured to discharge the high-pressure air,
the nozzle has an inlet port into which the high-pressure air is introduced, and
the foreign matter removal device further comprises:
a hose connecting the discharge port and the inlet port; and
a joint member connecting the hose and the nozzle and configured to change its posture with respect to the nozzle.

7. The foreign matter removal device according to claim 1, wherein
the tip end of the nozzle is positioned so as to face a center of the lens.

8. The vehicle comprising the foreign matter removal device according to claim 1.

9. A foreign matter removal device configured to remove foreign matters on a lens, the foreign matter removal device comprising:
a generation unit configured to generate high-pressure air; and
a nozzle configured to inject the high-pressure air toward the lens, wherein
the nozzle has:
an inlet port into which the high-pressure air is introduced;
an ejecting port from which the high-pressure air is ejected; and
a communication passage which communicates the inlet port and the ejecting port, and
the communication passage communicates with a bypass passage via an opening smaller than the ejecting port.

10. The foreign matter removal device according to claim 9, wherein
the lens is a lens of an in-vehicle camera, and
the foreign matter removal device is configured to remove foreign matters on the lens of the in-vehicle camera attached to a vehicle so that the lens of the in-vehicle camera is exposed toward an outside of a body panel of the vehicle.

11. The foreign matter removal device according to claim 10, wherein
a tip end of the nozzle has a first wall portion facing a front surface of the in-vehicle camera.

12. The foreign matter removal device according to claim 11, wherein
a shape of the nozzle is configured such that the high-pressure air flowing into the nozzle from the generation unit is injected toward the lens while hitting against the first wall portion.

13. The foreign matter removal device according to claim 11, wherein
the tip end of the nozzle has a pair of second wall portions extending from both side surfaces of the first wall portion toward the lens.

14. The foreign matter removal device according to claim 13, wherein
the pair of second wall portions have shapes corresponding to the shape of the front surface of the in-vehicle camera, and
the nozzle is attached to the in-vehicle camera so that the pair of second wall portions are in contact with the front surface.

15. The foreign matter removal device according to claim 11, wherein
the first wall portion has a fan-like shape enlarged toward the lens.

16. The foreign matter removal device according to claim 11, wherein
at least one protrusion configured to rectify the high-pressure air and blow it to the lens is provided on a surface of the first wall portion facing a front surface of the in-vehicle camera.

17. The foreign matter removal device according to claim 9, wherein
the bypass passage is formed so as to merge in an acute angle direction from the rear side with respect to a direction in which the high-pressure air flows in the communication passage.

18. The foreign matter removal device according to claim 9, wherein
the generation unit has a discharge port configured to discharge the high-pressure air,
the foreign matter removal device further comprises:
a hose connecting the discharge port and the inlet port of the nozzle; and
a connecting portion connecting the hose and the nozzle,
a groove is provided on an outer peripheral surface of the connecting portion, and
the groove constitutes the bypass passage in a state where the connecting portion is fitted to the inlet port of the nozzle.

19. The foreign matter removal device according to claim 9, wherein
the generation unit has a discharge port configured to discharge the high-pressure air,
the foreign matter removal device further comprises:
a hose connecting the discharge port and the inlet port of the nozzle; and
a connecting portion connecting the hose and the nozzle,
an opening of the connecting portion is smaller than the inlet port of the nozzle,
a gap is formed between an outer peripheral surface of the connecting portion and an inner peripheral surface of the inlet port in a state where a portion of the connecting portion is inserted to the inlet port, and
the gap constitute the bypass passage.

20. The foreign matter removal device according to claim 9, wherein
the generation unit has a piston, and
time during which the piston in the generation unit moves from a top dead center to a bottom dead center is ten times or more time during which the piston moves from the bottom dead center to the top dead center.

21. A foreign matter removal device configured to remove foreign matters on a lens of a camera attached so that the lens of the camera is exposed toward an outside of a panel member, the foreign matter removal device comprising:
a generation unit configured to generate high-pressure air; and
a nozzle unit having:
a nozzle configured to inject the high-pressure air toward the lens; and
an attachment part formed integrally with the nozzle and attachable to a housing of the camera, wherein
a tip end of the nozzle is positioned with respect to the lens in a state where the attachment part is attached to the housing;
wherein
the generation unit has a discharge port configured to discharge the high-pressure air,
the nozzle has an inlet port into which the high-pressure air is introduced, and
the foreign matter removal device further comprises:
a hose connecting the discharge port and the inlet port; and
a joint member connecting the hose and the nozzle and configured to change its posture with respect to the nozzle.

* * * * *